United States Patent
Pourreza et al.

(10) Patent No.: US 11,831,909 B2
(45) Date of Patent: Nov. 28, 2023

(54) LEARNED B-FRAME CODING USING P-FRAME CODING SYSTEM

(71) Applicant: QUALCOMM Incorporated, San Diego, CA (US)

(72) Inventors: Reza Pourreza, San Diego, CA (US); Taco Sebastiaan Cohen, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 48 days.

(21) Appl. No.: 17/198,813

(22) Filed: Mar. 11, 2021

(65) Prior Publication Data
US 2022/0295095 A1    Sep. 15, 2022

(51) Int. Cl.
*H04N 19/59* (2014.01)
*G06N 3/063* (2023.01)
(Continued)

(52) U.S. Cl.
CPC ............ *H04N 19/59* (2014.11); *G06N 3/045* (2023.01); *G06N 3/063* (2013.01); *G06N 3/088* (2013.01)

(58) Field of Classification Search
CPC .... H04N 19/59; H04N 19/139; H04N 19/172; H04N 19/577; H04N 19/82; H04N 19/117; G06N 3/0454; G06N 3/063; G06N 3/088
See application file for complete search history.

(56) References Cited

U.S. PATENT DOCUMENTS

| 8,934,552 | B2 | 1/2015 | Chien et al. |
| 2013/0202037 | A1 | 8/2013 | Wang et al. |

(Continued)

FOREIGN PATENT DOCUMENTS

| WO | WO-2012134956 A1 | 10/2012 |
| WO | 2019040134 A1 | 2/2019 |

OTHER PUBLICATIONS

Guo L., et al., "An End-to-End Learning Framework for Video Compression", IEEE Transactions on Pattern Analysis and Machine Intelligence, IEEE Computer Society, USA, vol. 43, No. 10, Apr. 20, 2020 (Apr. 20, 2020), pp. 3292-3308, XP011875084, ISSN: 0162-8828, DOI: 10.1109/TPAMI.2020.2988453 [retrieved on Sep. 1, 2021] sections 3, 4.

(Continued)

*Primary Examiner* — Tracy Y. Li
(74) *Attorney, Agent, or Firm* — Polsinelli LLP

(57) ABSTRACT

Techniques are described for processing video data, such as by performing learned bidirectional coding using a unidirectional coding system and an interpolated reference frame. For example, a process can include obtaining a first reference frame and a second reference frame. The process can include generating a third reference frame at least in part by performing interpolation between the first reference frame and the second reference frame. The process can include performing unidirectional inter-prediction on an input frame based on the third reference frame, such as by estimating motion between an input frame and the third reference frame, and generating a warped frame at least in part by warping one or more pixels of the third reference frame based on the estimated motion. The process can include generating, based on the warped frame and a predicted residual, a reconstructed frame representing the input frame, (Continued)

the reconstructed frame including a bidirectionally-predicted frame.

40 Claims, 22 Drawing Sheets

(51) Int. Cl.
*G06N 3/088* (2023.01)
*G06N 3/045* (2023.01)

(56) References Cited

U.S. PATENT DOCUMENTS

| | | | | |
|---|---|---|---|---|
| 2013/0202038 | A1* | 8/2013 | Seregin | H04N 19/52 |
| | | | | 375/240.15 |
| 2013/0335522 | A1* | 12/2013 | Zhang | H04N 19/597 |
| | | | | 348/43 |
| 2017/0034526 | A1* | 2/2017 | Rapaka | H04N 19/176 |
| 2019/0306526 | A1 | 10/2019 | Cho et al. | |
| 2021/0279840 | A1* | 9/2021 | Chi | G06N 3/08 |
| 2021/0281867 | A1* | 9/2021 | Golinski | H04N 19/42 |

OTHER PUBLICATIONS

International Search Report and Written Opinion—PCT/US2022/014143—ISA/EPO—dated May, 13, 2022.
Li B., et al., "Optical Flow Based Co-Located Reference Frame for Video Compression", IEEE Transactions on Image Processing, IEEE, USA, vol. 29, Aug. 12, 2020 (Aug. 12, 2020), pp. 8303-8315, XP011804954, ISSN: 1057-7149, DOI: 10.1109/TIP.2020.3014723, [retrieved on Aug. 14, 2020] sections III, IV.
Park W., et al., "Deep Predictive Video Compression Using Mode-Selective Uni- and Bi-Directional Predictions Based on Multi-Frame Hypothesis", IEEE Access, IEEE, USA, vol. 9, Dec. 21, 2020 (Dec. 21, 2020), pp. 72-85, XP011829522, DOI: 10.1109/ACCESS.2020.3046040 [retrieved on Jan. 4, 2021] section III, figure 1.

* cited by examiner

|  | GoP 1 | | | | | GoP 2 | | | | ... |
|---|---|---|---|---|---|---|---|---|---|---|
| Type | I | ... | B | ... | P | ... | B | ... | P | ... |
| Order | first | | third | | second | | second | | first | ... |
| Ref | | | | | | | | | | ... |

FIG. 10

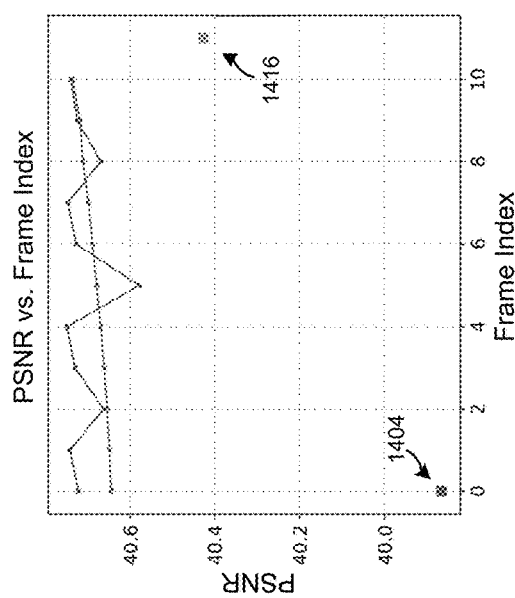
FIG. 14B
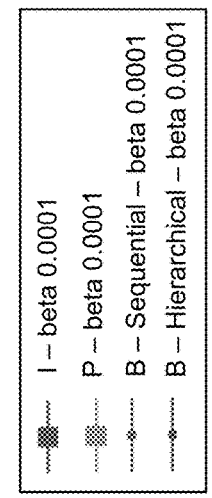
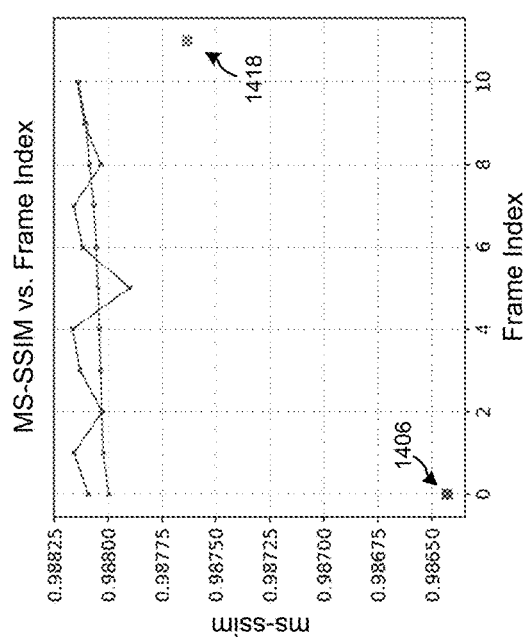
FIG. 14C
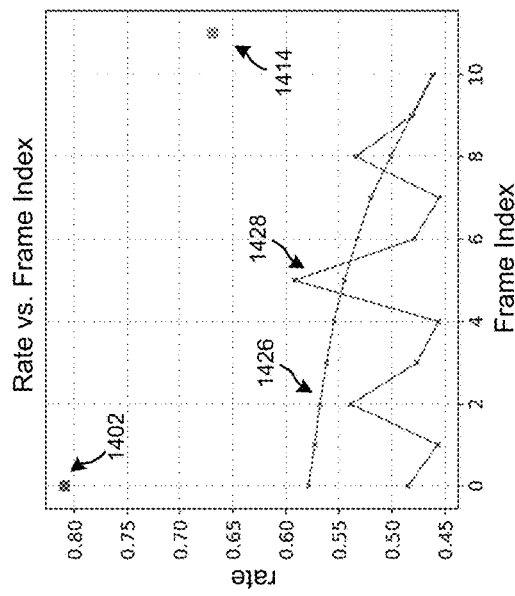
FIG. 14A

1600

```
┌─────────────────────────────────────────────────┐
│  OBTAINING AN INTERPOLATED REFERENCE FRAME AND MOTION │
│  INFORMATION REPRESENTING MOTION BETWEEN AN INPUT │
│  FRAME AND THE INTERPOLATED REFERENCE FRAME     │
│                    1602                          │
└─────────────────────────────────────────────────┘
                        ↓
┌─────────────────────────────────────────────────┐
│  ESTIMATE, BASED ON THE MOTION INFORMATION, THE MOTION │
│  BETWEEN THE INPUT FRAME AND THE INTERPOLATED   │
│  REFERENCE FRAME                                │
│                    1604                          │
└─────────────────────────────────────────────────┘
                        ↓
┌─────────────────────────────────────────────────┐
│  GENERATE A WARPED FRAME AT LEAST IN PART BY WARPING │
│  ONE OR MORE PIXELS OF THE INTERPOLATED REFERENCE │
│  FRAME BASED ON THE ESTIMATED MOTION            │
│                    1606                          │
└─────────────────────────────────────────────────┘
                        ↓
┌─────────────────────────────────────────────────┐
│  GENERATE, BASED ON THE WARPED FRAME AND A PREDICTED │
│  RESIDUAL, A RECONSTRUCTED FRAME REPRESENTING THE │
│  INPUT FRAME, THE RECONSTRUCTED FRAME INCLUDING A │
│  BIDIRECTIONALLY-PREDICTED FRAME                │
│                    1608                          │
└─────────────────────────────────────────────────┘
```

FIG. 16

LEARNED B-FRAME CODING USING P-FRAME CODING SYSTEM

TECHNICAL FIELD

The present disclosure generally relates to video coding (e.g., encoding and/or decoding video data). For example, aspects of the present disclosure relate to learned bidirectional-predicted frame (B-frame) coding using unidirectional coding systems (e.g., a unidirectional-predicted frame (P-frame) encoder-decoder or CODEC).

BACKGROUND

Many devices and systems allow video data to be processed and output for consumption. Digital video data includes large amounts of data to meet increasing demands in video quality, performance, and features. For example, consumers of video data typically desire high quality videos, with high fidelity, resolutions, frame rates, and the like. The large amounts of video data often needed to meet these demands places a significant burden on communication networks and devices that process and store the video data. Video coding techniques may be used to compress video data. One example goal of video coding is to compress video data into a form that uses a lower bit rate, while avoiding or minimizing degradations in video quality. With ever-evolving video services becoming available and the increasing demands in large amounts of video data, coding techniques with better performance and efficiency are needed.

SUMMARY

Systems and techniques are described herein that include learned bidirectional (e.g., B-frame) coding using unidirectional (e.g., P-frame) coding systems, which can utilize reference frames generated by interpolating between reference frames. According to at least one example, a method is provided for processing video data. The method can include: obtaining a first reference frame and a second reference frame; generating a third reference frame at least in part by performing interpolation between the first reference frame and the second reference frame; and performing unidirectional inter-prediction on an input frame based on the third reference frame.

In another example, a system is provided for processing video data. The system can include a bidirectional coding engine including an interpolation engine and a unidirectional coding engine. In some cases, the system can include at least one memory and one or more processors (e.g., implemented in circuitry) coupled to the memory. The interpolation engine is configured to: obtain a first reference frame and a second reference frame; and generate a third reference frame at least in part by performing interpolation between the first reference frame and the second reference frame. The unidirectional coding engine is configured to perform unidirectional inter-prediction on an input frame based on the third reference frame.

In another example, a non-transitory computer-readable medium is provided for processing video data. The non-transitory computer-readable medium can include instructions stored thereon which, when executed by one or more processors, cause the one or more processors to: obtain a first reference frame and a second reference frame; generate a third reference frame at least in part by performing interpolation between the first reference frame and the second reference frame; and perform unidirectional inter-prediction on an input frame based on the third reference frame.

According to another example, an apparatus for processing video data is provided. The apparatus can include: means for obtaining a first reference frame and a second reference frame; means for generating a third reference frame at least in part by performing interpolation between the first reference frame and the second reference frame; and means for performing unidirectional inter-prediction on an input frame based on the third reference frame.

In some aspects, the method, apparatuses, and non-transitory computer-readable medium and described above can include: estimating motion between the input frame and the third reference frame; and generating a warped frame at least in part by warping one or more pixels of the third reference frame based on the estimated motion.

In some aspects, the method, apparatuses, and non-transitory computer-readable medium and described above can include determining a residual at least in part by determining a difference between the input frame and the warped frame; and generating a predicted residual using the residual.

In some aspects, the method, apparatuses, and non-transitory computer-readable medium and described above can include: generating, based on the warped frame and the predicted residual, a reconstructed frame representing the input frame, the reconstructed frame including a bidirectionally-predicted frame; and causing the reconstructed frame to be stored in a memory.

In some aspects, the motion is estimated using a first autoencoder, and the predicted residual is generated using a second autoencoder.

In some aspects, the method, apparatuses, and non-transitory computer-readable medium and described above can include: obtaining a fourth reference frame; estimating motion between an additional input frame and the fourth reference frame; generating an additional warped frame at least in part by warping one or more pixels of the fourth reference frame based on the estimated motion; and generating, based on the additional warped frame and an additional predicted residual, a reconstructed frame representing the additional input frame, the reconstructed frame representing the additional input frame including a unidirectionally-predicted frame.

In some aspects, the method, apparatuses, and non-transitory computer-readable medium and described above can include: determining a first set of motion information representing pixel motion from the first reference frame to the third reference frame; determining a second set of motion information representing pixel motion from the second reference frame to the third reference frame; generating first warping information at least in part by performing a warping function on the first reference frame using the first set of motion information; generating second warping information at least in part by performing the warping function on the second reference frame using the second set of motion information; and generating the third reference frame based on the first warping information and the second warping information.

In some aspects, the first set of motion information and the second set of motion information are determined based on pixel motion between the first reference frame and the second reference frame.

In some aspects, the first set of motion information includes a first optical flow map and the second set of motion information includes a second optical flow map.

In some aspects, the warping function includes a bilinear interpolation function.

In some aspects, the estimated motion between the input frame and the third reference frame includes optical flow data.

In some aspects, the estimated motion between the input frame and the third reference frame includes dynamic convolution data.

In some aspects, the estimated motion between the input frame and the third reference frame includes block-based motion data.

According to at least one example, a method is provided for processing video data. The method can include: obtaining an interpolated reference frame and motion information representing motion between an input frame and the interpolated reference frame; estimating, based on the motion information, the motion between the input frame and the interpolated reference frame; generating a warped frame at least in part by warping one or more pixels of the interpolated reference frame based on the estimated motion; and generating, based on the warped frame and a predicted residual, a reconstructed frame representing the input frame, the reconstructed frame including a bidirectionally-predicted frame.

In another example, a system is provided for processing video data. The system can include at least one memory and one or more processors (e.g., implemented in circuitry) coupled to the memory. The at least one processor is configured to: obtain an interpolated reference frame and motion information representing motion between an input frame and the interpolated reference frame; estimate, based on the motion information, the motion between the input frame and the interpolated reference frame; generate a warped frame at least in part by warping one or more pixels of the interpolated reference frame based on the estimated motion; and generate, based on the warped frame and a predicted residual, a reconstructed frame representing the input frame, the reconstructed frame including a bidirectionally-predicted frame.

In another example, a non-transitory computer-readable medium is provided for processing video data. The non-transitory computer-readable medium can include instructions stored thereon which, when executed by one or more processors, cause the one or more processors to: obtain an interpolated reference frame and motion information representing motion between an input frame and the interpolated reference frame; estimate, based on the motion information, the motion between the input frame and the interpolated reference frame; generate a warped frame at least in part by warping one or more pixels of the interpolated reference frame based on the estimated motion; and generate, based on the warped frame and a predicted residual, a reconstructed frame representing the input frame, the reconstructed frame including a bidirectionally-predicted frame.

According to another example, an apparatus for processing video data is provided. The apparatus can include: means for obtaining an interpolated reference frame and motion information representing motion between an input frame and the interpolated reference frame; means for estimating, based on the motion information, the motion between the input frame and the interpolated reference frame; means for generating a warped frame at least in part by warping one or more pixels of the interpolated reference frame based on the estimated motion; and means for generating, based on the warped frame and a predicted residual, a reconstructed frame representing the input frame, the reconstructed frame including a bidirectionally-predicted frame.

In some aspects, the method, apparatuses, and non-transitory computer-readable medium and described above can include: obtaining a first reference frame and a second reference frame; and generating the interpolated reference frame at least in part by performing interpolation between the first reference frame and the second reference frame.

In some aspects, the method, apparatuses, and non-transitory computer-readable medium and described above can include: obtaining a residual from a bitstream; and generating the predicted residual based on the obtained residual.

In some aspects, the motion information is obtained from the bitstream.

In some aspects, the method, apparatuses, and non-transitory computer-readable medium and described above can include: obtaining a fourth reference frame; estimating motion between an additional input frame and the fourth reference frame; generating an additional warped frame at least in part by warping one or more pixels of the fourth reference frame based on the estimated motion; and generating, based on the additional warped frame and an additional predicted residual, a reconstructed frame representing the additional input frame, the reconstructed frame representing the additional input frame including a unidirectionally-predicted frame.

In some aspects, the apparatus can include or be part of a mobile device, a wearable device, an extended reality device (e.g., a virtual reality (VR) device, an augmented reality (AR) device, or a mixed reality (MR) device), a personal computer, a laptop computer, a server computer, a television, a video game console, or other device. In some aspects, the apparatus comprises a mobile device (e.g., a mobile telephone or so-called "smart phone"). In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit the reconstructed video frame over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 10 is a diagram illustrating an example of an I-frame, B-Frame, P-Frame (IBP) coding technique, in accordance with some examples of the disclosure;

FIG. 14A-FIG. 14F are graphs illustrating further performance results of the B-frame coding system described herein, in accordance with some examples of the disclosure;

FIG. 16 is a flowchart illustrating another example of a process for processing video data, in accordance with some examples of the disclosure.

DETAILED DESCRIPTION

Figure 1:
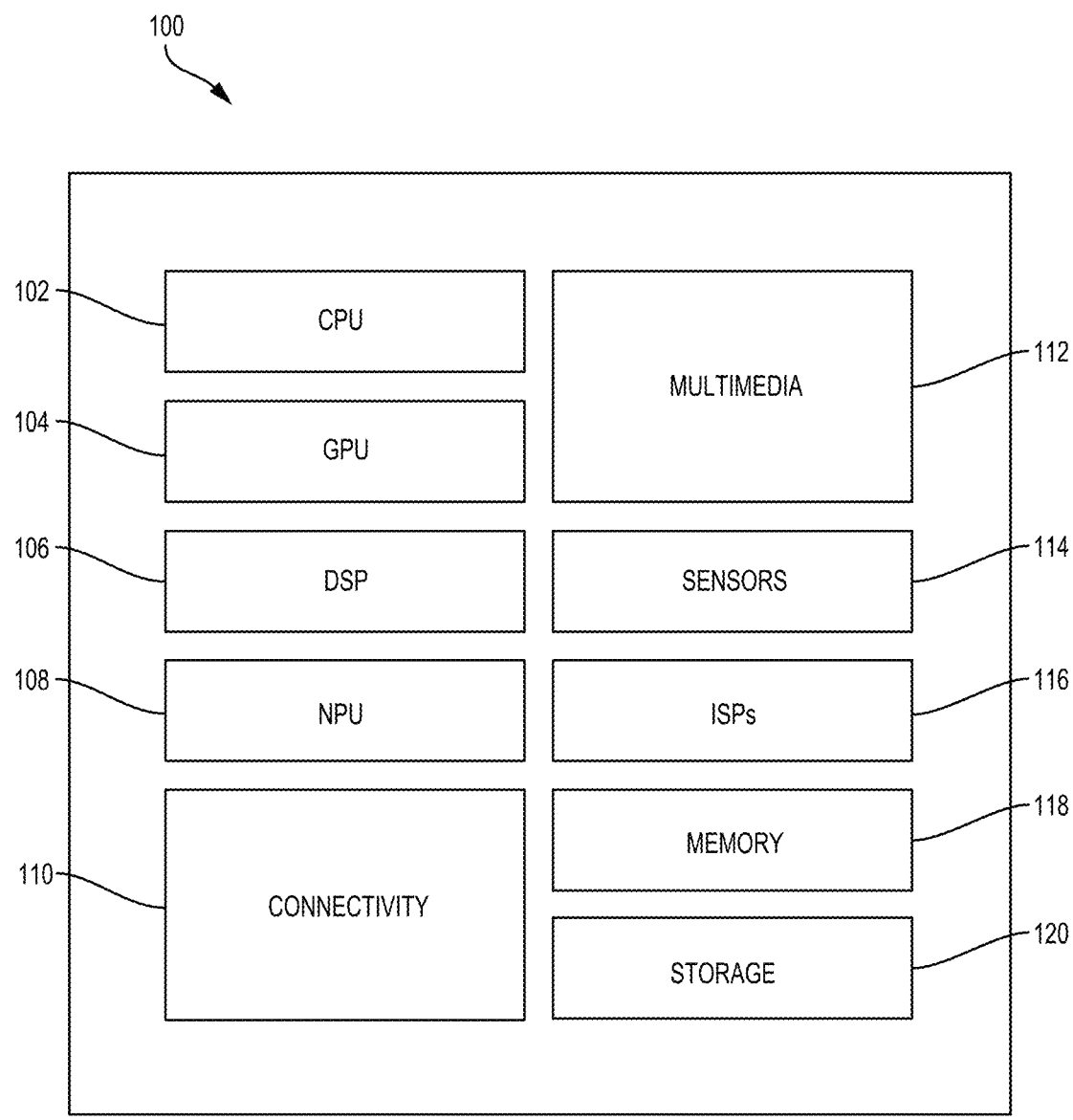
FIG. 1 illustrates an example image processing system which can implement the various techniques described herein, in accordance with some examples of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data often needed to meet such demands can place a significant burden on communication networks as well devices that process and store the video data.

Various techniques can be used to code video data. In some cases, video coding can be performed according to a particular video coding standard and/or scheme. Example video coding standards include high-efficiency video coding (HEVC), advanced video coding (AVC), moving picture experts group (MPEG) coding, versatile video coding (VVC), among others. One goal of video coding techniques is to compress video data into a form that uses a lower bit rate, while avoiding or minimizing degradations in the video quality. As the demand for video services grows and new video services become available, coding techniques with better efficiency and performance are needed.

Video coding can use prediction methods such as intra-prediction or inter-prediction, which take advantage of redundancies present in video frames or other sequences of images or frames. Intra-prediction is performed using the data within a single frame of video, and is based on the spatial characteristics of the frame. Frames coded using intra-prediction are referred to as I-frames. Inter-prediction of a frame is performed based on temporal characteristics of the frame relative to other frames. For example, inter-prediction of a video frame can be performed by identifying regions of other video frames that include changes relative to the video frame and regions that include redundancies relative to the video frame (e.g., background regions that remain largely unchanged). The redundancies can be removed, resulting in a residual for the video frame. The residual can be further encoded (e.g., using entropy coding), and the result can be included in a bitstream that is stored, transmitted, or otherwise output.

Examples of inter-prediction include unidirectional prediction (uni-prediction) and bidirectional prediction (bi-prediction). Uni-prediction includes the use of a single reference frame when performing inter-prediction of a frame. Frames coded using uni-prediction are referred to as P-frames. Bi-prediction involves the use of two reference frames when performing inter-prediction of a frame. Frames coded using bi-prediction are referred to as B-frames.

In some cases, machine learning systems can be used to perform video encoding (compression) and decoding (decompression). In general, machine learning (ML) is a subset of artificial intelligence (AI). ML systems include algorithms and statistical models that computer systems can use to perform various tasks by relying on patterns and inference. One example of a ML system is a neural network (also referred to as an artificial neural network), which can include an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing operations on the data. The results of the operations performed on the input data are selectively passed to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network. For instance, weight values may be established during a training phase in which the network learns how to identify particular classes by their typical input data characteristics. In one example, the network may be trained to learn a particular task by adapting values of parameters associated with the neurons (e.g., activation parameters and/or weights, biases, etc.), adding and/or removing neurons or even layers of neurons, adding or removing edges between neurons, etc.

Different types of neural networks exist, such as autoencoders, convolutional neural networks (CNNs), recurrent neural networks (RNNs), multilayer perceptron (MLP) neural networks, among others. Convolutional neural networks may include collections of artificial neurons that each have a receptive field (e.g., a spatially localized region of an input space) and that collectively tile an input space. Convolutional neural networks have numerous applications. For example, CNNs can be broadly used in the area of pattern recognition and classification. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, machine learning based P-frame and B-frame coding systems can be used to perform uni-prediction and bi-prediction, respectively. In some cases, such systems can include neural network architectures (e.g., one or more deep neural networks, such as one or more autoencoders). An example of a machine learning based P-frame coding system can perform motion compression and motion compensation on a current frame and a reference frame to determine a prediction of motion between the current frame and the reference frame. The motion prediction can be used to modify the pixels of the reference frame (e.g., by moving the pixels of the reference frame according to motion vectors included in the motion prediction), resulting in a prediction for the current frame. A residual portion of the P-frame coding system can generate a predicted residual representing a difference between the prediction and the current frame. The predicted residual can be combined with the prediction to generate a reconstructed current frame.

Various types of machine learning based B-frame coding systems can be used to perform bi-prediction. One example of a machine learning based B-frame coding system is similar to the P-frame system described above, but uses two reference frames instead of a single reference frame to generate a reconstructed current frame. Another example of a machine learning based B-frame coding system includes a frame interpolation engine that generates a prediction based on an interpolation between two reference frames. A residual portion then determines a predicted residual that is combined with the prediction from the interpolation engine.

Systems, methods (also referred to as processes), apparatuses, and computer-readable media (collectively referred to as "systems and techniques") are described herein for performing learned bidirectional (e.g., B-frame) coding using a unidirectional (e.g., P-frame) coding system. As used herein, the term coding can refer to encoding (e.g., compression), decoding (e.g., decompression), or both encoding and decoding. For example, a bidirectional coding system (also referred to as a B-frame coding system) is provided that includes a frame interpolation engine for generating an interpolated reference frame based on at least two reference frames. In some examples, the frame interpolation engine can generate the interpolated reference frame using motion information (e.g., optical flow or other motion based technique) associated with the reference frames used to generate the interpolated reference frame.

The bidirectional coding system can use a unidirectional coding system (also referred to as a P-frame coding system) to generate a bidirectionally-predicted frame (B-frame). For instance, the unidirectional coding system can use the interpolated reference frame to generate a B-frame. A B-frame can include a type of frame that is generated by referencing data from previous and future frames (e.g., frames preceding and following the B-frame in display order and/or decoding order). In addition to being used for B-frame coding, the unidirectional coding system can also be used to generate unidirectionally-predicted frames (P-frames) when a uni-prediction mode is performed for a particular frame. For instance, an actual reference frame can be used by the unidirectional coding system to generate a P-frame. A P-frame can include a type of frame that is generated by referencing data from a single reference frame, which can include a previous frame (e.g., a frame preceding the B-frame in coding order) or a future frame (e.g., a frame following the B-frame in coding order). As used herein, the terms frame, picture, and image can be used interchangeably.

In some examples, the unidirectional coding system can include a video encoder and a video decoder that can use machine learning to process video data and generate a prediction for an input frame. In some aspects, the video encoder can include an encoder neural network of a motion prediction system (e.g., a motion autoencoder) and the video decoder can include a decoder neural network of the motion prediction system. For example, the video encoder (e.g., the encoder neural network of the motion prediction system) can use machine learning to generate latent data (e.g., a bitstream) representing predicted motion between an input frame and a reference frame (e.g., an interpolated reference frame when bi-prediction is being performed or an actual reference frame, such as a reconstructed P- or B-frame or an I-frame that is not generated based on interpolation, when uni-prediction is being performed). The video decoder (e.g., the decoder neural network of the motion prediction system) can use machine learning to process the latent data and predict or reconstruct the motion between the input frame and the reference frame. The predicted motion can be used by the unidirectional coding system to generate a prediction for the input frame by warping the respective part of the reference frame. For instance, the predicted motion can include motion vectors (e.g., an optical flow map including a motion vector for each pixel or block of pixels of the input frame). A warping engine can move the pixels of the reference frame according to the motion vectors to generate the prediction for the input frame (referred to as a warped frame).

In some examples, the video encoder and the video decoder of the unidirectional coding system can also use machine learning to generate a residual for the input frame. In some aspects, the unidirectional coding system can include a residual prediction system (e.g., a residual autoencoder) that includes an encoder neural network and a decoder neural network, which can generate a residual for the input frame. For example, the video encoder (e.g., the encoder neural network of the residual prediction system) can receive as input a residual including a difference between the input frame and the reference frame (e.g., the interpolated reference frame when bi-prediction is being performed or the actual reference frame when uni-prediction is being performed). Using the residual as input, the video encoder can use machine learning to generate latent data (e.g., a bitstream) representing the residual. The video decoder (e.g., the decoder neural network of the residual prediction system) can use machine learning to process the latent data and predict or reconstruct the residual. The unidirectional coding system can generate a reconstructed frame representing the input frame by adding the predicted residual to the prediction generated for the input frame (e.g., by the warping engine).

In some examples, the system can transmit the latent data representing the motion and the latent data representing the residual (e.g., in an encoded video bitstream) to another device for decoding. For instance, another device can include a video decoder (e.g., a motion prediction system and a residual prediction system, as described above) that can use machine learning to reconstruct the input frame based on the latent data representing the motion and the latent data representing the residual, similar to that described above (e.g., by processing the motion latent data to predict the motion between the input frame and the reference frame, generate a prediction for the input frame by warping the reference frame according to the predicted motion, process the residual latent data to predict the residual, and generate the reconstructed frame by adding the predicted residual to the prediction generated for the input frame).

Further aspects of the systems and techniques will be described with respect to the figures. FIG. 1 illustrates an example implementation of an image processing system 100 that, in some cases, can be used to implement the systems and techniques described herein. The image processing system 100 can include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, image data, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 and/or from a memory block 118.

The image processing system 100 can also include additional processing blocks for performing specific functions, such as a GPU 104; a DSP 106; a connectivity block 110, which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect image features. In some examples, the NPU 108 can be implemented in the CPU 102, DSP 106, and/or GPU 104. In some cases, the image processing system 100 may also include one or more sensor 114, one or more image signal processors (ISPs) 116, and/or storage 120.

In some examples, the image processing system 100 can implement an ARM instruction set architecture for one or more processors. In an aspect of the present disclosure, the instructions loaded into the CPU 102 may include code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may include code to store a computed multiplication product of the input value and the filter weight when a lookup table miss of the multiplication product is detected.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

The image processing system 100 and/or components thereof may be configured to perform video compression and/or decompression (also referred to as video encoding and/or decoding, collectively referred to as video coding) using techniques according to aspects of the present disclosure discussed herein. By using deep learning architectures and the techniques described herein to perform video compression and/or decompression, aspects of the present disclosure can increase the efficiency of video compression and/or decompression on a device and/or reduce associated resource requirements and/or usage. For example, a device using the video coding techniques described herein can compress video data more efficiently, can reduce the amount of data transmitted in compressed video data to a destination device, and the destination device can receive and decompress the compressed video data efficiently. In some examples, the deep learning architectures and techniques described herein can reduce the amount of data exchanged between coding devices or components, such as encoders and decoders, to code video content. The reduced amount of data transmitted for video coding can reduce latencies, increase performance, and reduce the cost or burden on computing resources such as, for example, bandwidth, memory, storage, power, compute, hardware, etc.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize features, such as edges, in the input stream. In another example, if presented with auditory data, the first layer may learn to recognize spectral power in specific frequencies. The second layer, taking the output of the first layer as input, may learn to recognize features, such as shapes for visual data or combinations of sounds for auditory data. For instance, higher layers may learn to represent complex shapes in visual data or words in auditory data. Still higher layers may learn to recognize common visual objects and/or spoken phrases.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
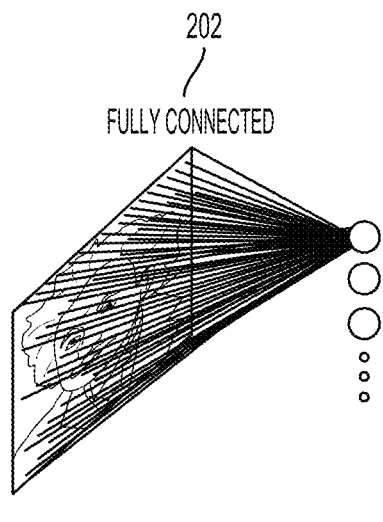
FIG. 2A illustrates an example of a fully connected neural network, in accordance with some examples of the disclosure.
Figure 2B:
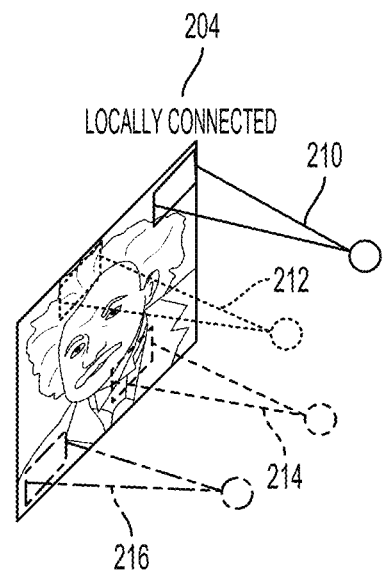
FIG. 2B illustrates an example of a locally connected neural network, in accordance with some examples of the disclosure.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
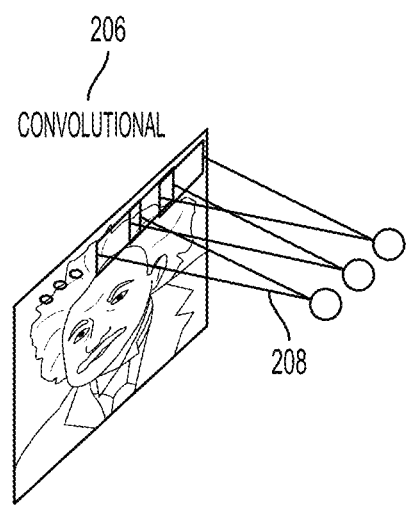
FIG. 2C illustrates an example of a convolutional neural network, in accordance with some examples of the disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
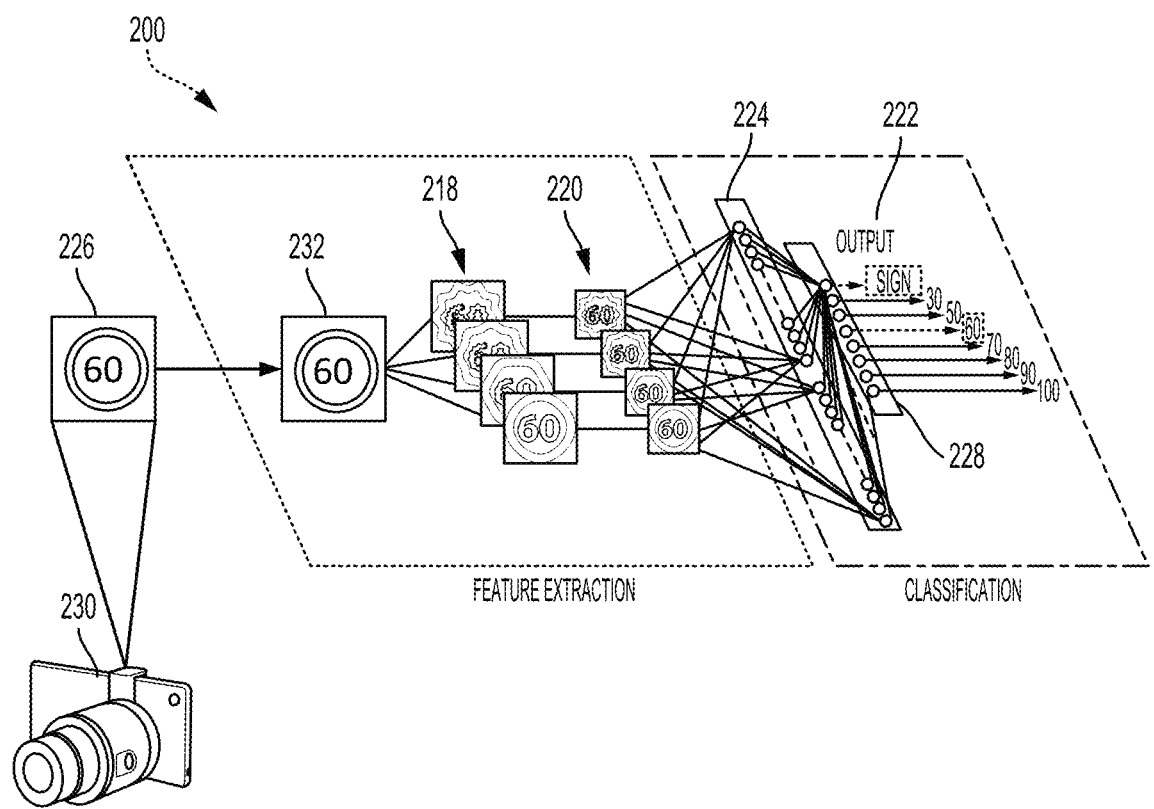
FIG. 2D illustrates a detailed example of a deep convolutional network (DCN) designed to recognize features from an image, in accordance with some examples of the disclosure.

One type of convolutional neural network is a deep convolutional network (DCN). FIG. 2D illustrates an example of a DCN 200 designed to recognize features from an image 226 input from an image capturing device 230, such as a camera or image sensor. In some examples, the DCN 200 of the current example may be trained to identify visual features in the image 226, such as one or more objects or signs in the image 226, for example.

In some examples, the DCN 200 may be trained with supervised learning. During training, the DCN 200 may be presented with an image, such as the image 226, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign", "60", and "100". A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30", "40", "50", "70", "80", "90", and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs can achieve high performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less than, for example, that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
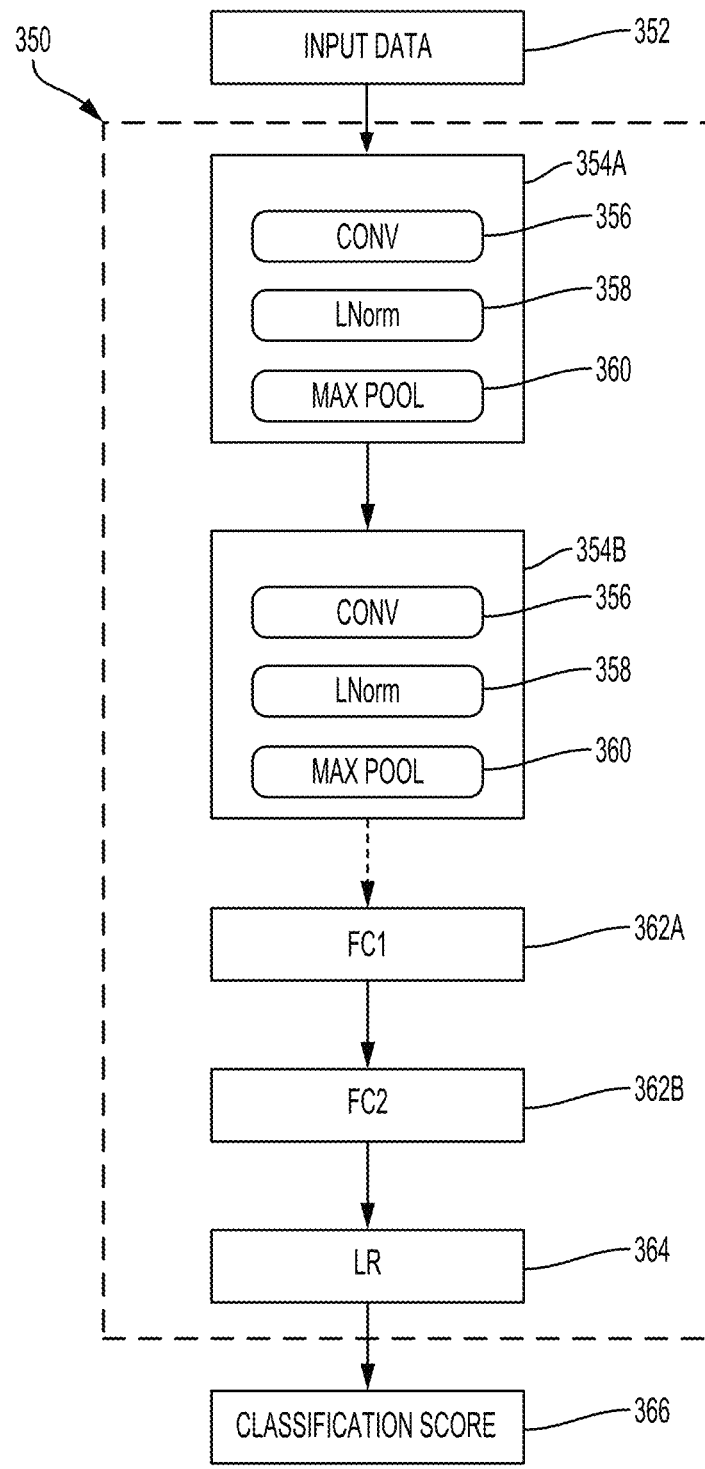
FIG. 3 is a block diagram illustrating another example DCN, in accordance with some examples of the disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preferences. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In some examples, the parallel filter banks may be loaded on the DSP 106 or an ISP 116 of an image processing system 100. The deep convolutional network 350 may access other processing blocks that may be present on the image processing system 100.

The deep convolutional network 350 may include one or more fully connected layers, such as layer 362A (labeled "FC1") and layer 362B (labeled "FC2"). The deep convolutional network 350 may include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Another type of neural network is an autoencoder. An autoencoder can be trained (e.g., using training data and one or more loss functions) to receive input and to generate a version of that input at its output (e.g., to essentially copy its input to its output). An autoencoder can be trained to learn efficient data codings in an unsupervised manner. For example, given an image of an object, an autoencoder can first encode the image into a lower dimensional latent representation, and can then decode the latent representation back to an image of the object. An autoencoder can learn (through training) to compress the input data while minimizing the reconstruction error.

As noted above, digital video data can include large amounts of data, which can place a significant burden on communication networks and devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Thus, it is desirable to reduce the amount of bandwidth used to deliver video content in these networks.

Because uncompressed video content can result in large files that may involve sizable memory for physical storage and considerable bandwidth for transmission, video coding techniques can be utilized to compress and decompress such video content, as further described herein. To reduce the size of video content—and thus the amount of storage involved to store video content and the amount of bandwidth involved in delivering video content—various video coding techniques can be performed according to a particular video coding standard and/or scheme, such as HEVC, AVC, MPEG, VVC, among others. Video coding can use prediction methods such as inter-prediction or intra-prediction, which take advantage of redundancies present in video images or sequences. One goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

An encoding device can encode video data according to a video coding standard to generate an encoded video bitstream. In some examples, an encoded video bitstream (or "video bitstream" or "bitstream") can include a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types can include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (unidirectional predicted frames) is a slice of a picture that may be coded with intra-prediction and with unidirectional inter-prediction. Each prediction unit or prediction block within a P slice is either coded with intra-prediction or inter-prediction. When inter-prediction applies, the prediction unit or prediction block is predicted by one reference picture, and therefore reference samples are from one reference region of one frame. A B slice (bidirectional predictive frames) is a slice of a picture that may be coded with intra-prediction and inter-prediction (e.g., either bi-prediction or uni-prediction). A prediction unit or prediction block of a B slice may be bidirectionally-predicted from two reference pictures. Each picture can contribute a reference region and sample sets of the two reference regions can be weighted (e.g., with equal weights or with different weights) to produce the prediction signal of the bidirectionally-predicted block. As explained above, slices of one picture are independently coded. In some cases, a picture can be coded as just one slice.

After performing prediction using intra- and/or inter-prediction, the encoding device can perform transformation and quantization. For example, following prediction, the encoding device may calculate residual values corresponding to the PU. Residual values may include pixel difference values between the current block of pixels being coded (the PU) and the prediction block used to predict the current block (e.g., the predicted version of the current block). For example, after generating a prediction block (e.g., using inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding standards (e.g., the HEVC video coding techniques described above) may be able to retain much of the information in raw video content and may be defined a priori based on signal processing and information theory concepts. However, while various compression algorithms may be applicable generally (e.g., to any type of video content), these video coding techniques may lack certain characteristics that are beneficial in a network-based environment or other type of environment. For example, video coding systems should be able to implement low-latency operation. However, video coding systems and related techniques that operate according to existing video coding Standards may encode and transmit video in batches of several frames (sometimes referred to as a Group-of-Pictures or GoP), and may need to wait for the accumulation of the frames of a batch (e.g., a GoP) to be transmitted. Such batch-based video coding results in higher latency than could be achieved using frame-by-frame coding and transmission.

Figure 4:
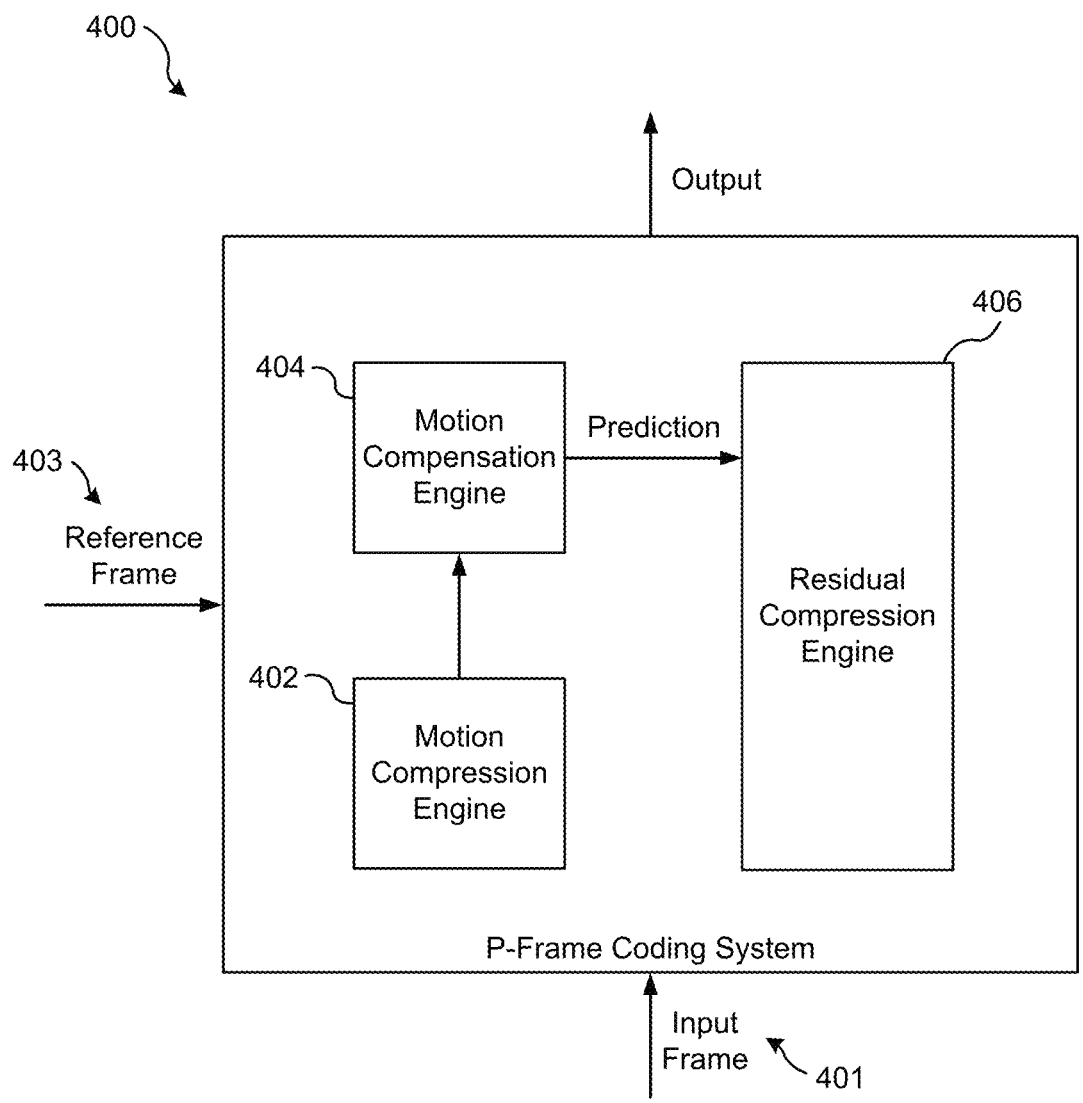
FIG. 4 is a diagram illustrating an example of a unidirectional-predicted frame (P-frame) coding system configured to perform unidirectional motion compression and compensation to generate a prediction, in accordance with some examples of the disclosure.

In some cases, machine learning based P-frame coding systems (e.g., including one or more neural networks) can be used to perform uni-prediction. FIG. 4 is a diagram illustrating an example of a machine learning based P-frame coding system 400. The components of the P-frame coding system 400 includes a motion compression engine 402, a motion compensation engine 404, and a residual compression engine 406. The components of the P-frame coding system 400 can include one or more neural networks configured to perform unidirectional inter-prediction (uni-prediction) using the motion compression engine 402, the motion compensation engine 404, and the residual compression engine 406.

For example, the motion compression engine 402 can obtain an input frame 401 and a reference frame 403. The motion compression engine 402 can perform machine learning based motion compression to determine a prediction of motion between the input frame 401 and the reference frame 403. The motion compression engine 402 can provide the predicted motion information to the motion compensation engine 404. The motion compensation engine 404 can also receive the reference frame 403 as input. The motion compensation engine 404 can use the motion prediction to modify the pixels of the reference frame and generate a prediction of the input frame 403. For instance, the motion compensation engine 404 can move the pixels of the reference frame according to motion vectors included in the motion prediction. The residual compression engine 406 can generate a predicted residual representing a difference between the prediction and the input frame 401. The predicted residual can then be combined with the prediction to generate a reconstructed input frame. The reconstructed input frame can be output for storage, display, etc.

Figure 5A:
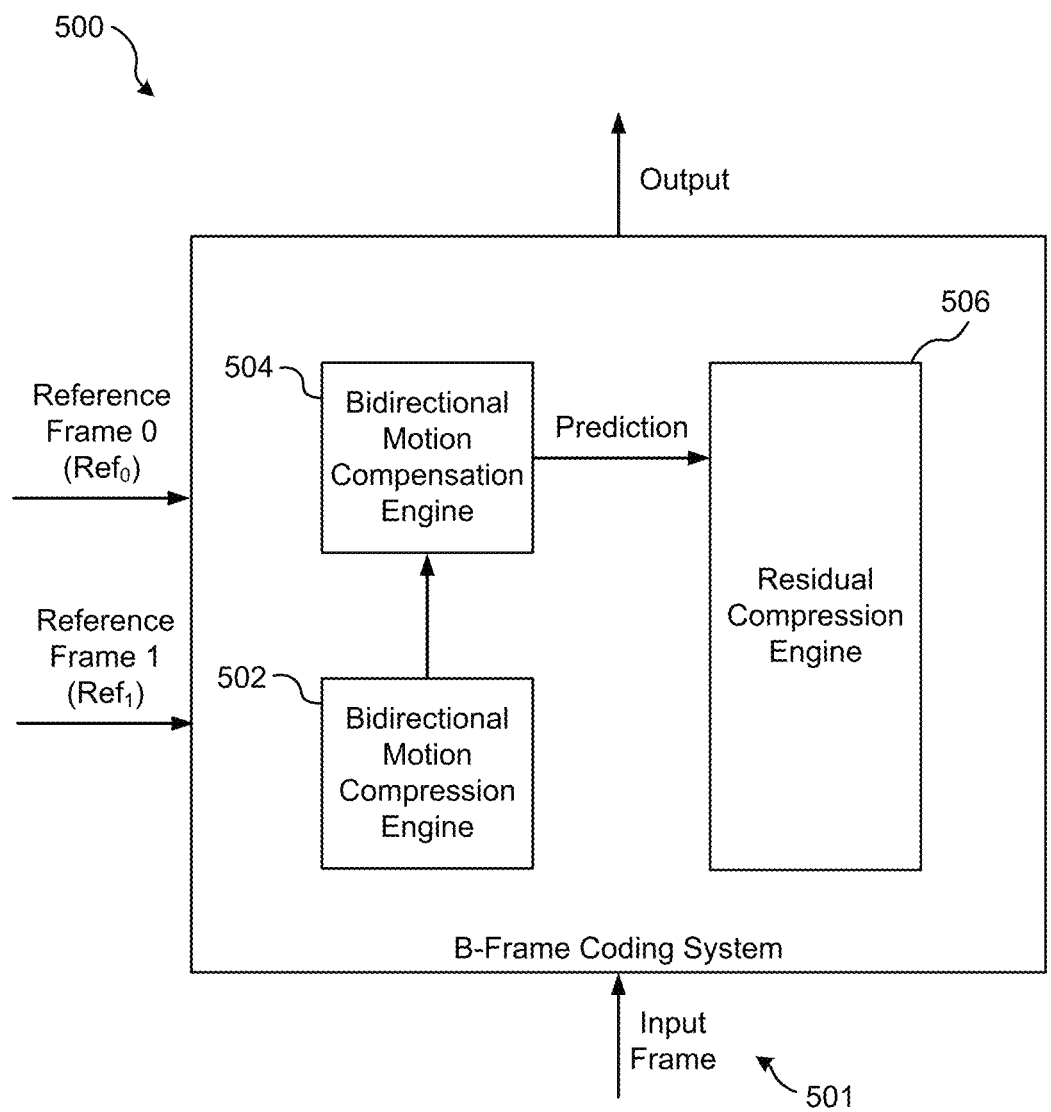
FIG. 5A is a diagram illustrating an example of a bidirectional-predicted frame (B-frame) coding system configured to perform bidirectional motion compression and compensation to generate a prediction, in accordance with some examples of the disclosure.

In some cases, machine learning based B-frame coding systems can be used to perform bi-prediction. FIG. 5A is a diagram illustrating an example of a B-frame coding system 500. The components of the B-frame coding system 500 includes a motion compression engine 502, a motion compensation engine 504, and a residual compression engine 506. The components of the B-frame coding system 500 can include one or more neural networks configured to perform bidirectional inter-prediction (bi-prediction) using the motion compression engine 502, the motion compensation engine 504, and the residual compression engine 506. The bi-prediction is performed based on two reference frames (denoted in FIG. 5A as reference frame 0 ($Ref_0$) and reference frame 1 ($Ref_1$)) instead of a single reference frame.

For example, an input frame 501 and the reference frames $Ref_0$ and $Ref_1$ can be provided to the motion compression engine 502 as input. The motion compression engine 502 can perform machine learning based motion compression to determine a first prediction of motion between the input frame 501 and the first reference frame $Ref_0$ and a second prediction of motion between the input frame 501 and the second reference frame $Ref_1$. The motion compensation engine 504 can receive as input the reference frames $Ref_0$ and $Ref_1$ and the predicted motion from the motion compression engine 502. The motion compensation engine 504 can use the two motion predictions to modify the pixels of the reference frames $Ref_0$ and $Ref_1$ and generate a prediction of the input frame 501. For instance, the motion compensation engine 504 can move the pixels of the first reference frame $Ref_0$ according to the first motion prediction and can move the pixels of the second reference frame $Ref_1$ according to the second motion prediction. The motion compensation engine 504 can merge the two predictions to generate a merged prediction for the input frame 501.

The residual compression engine 506 can generate a predicted residual representing a difference between the merged prediction and the input frame 501. The predicted residual can then be combined with the merged prediction to generate a reconstructed input frame, which can be output for storage or display.

Figure 5B:
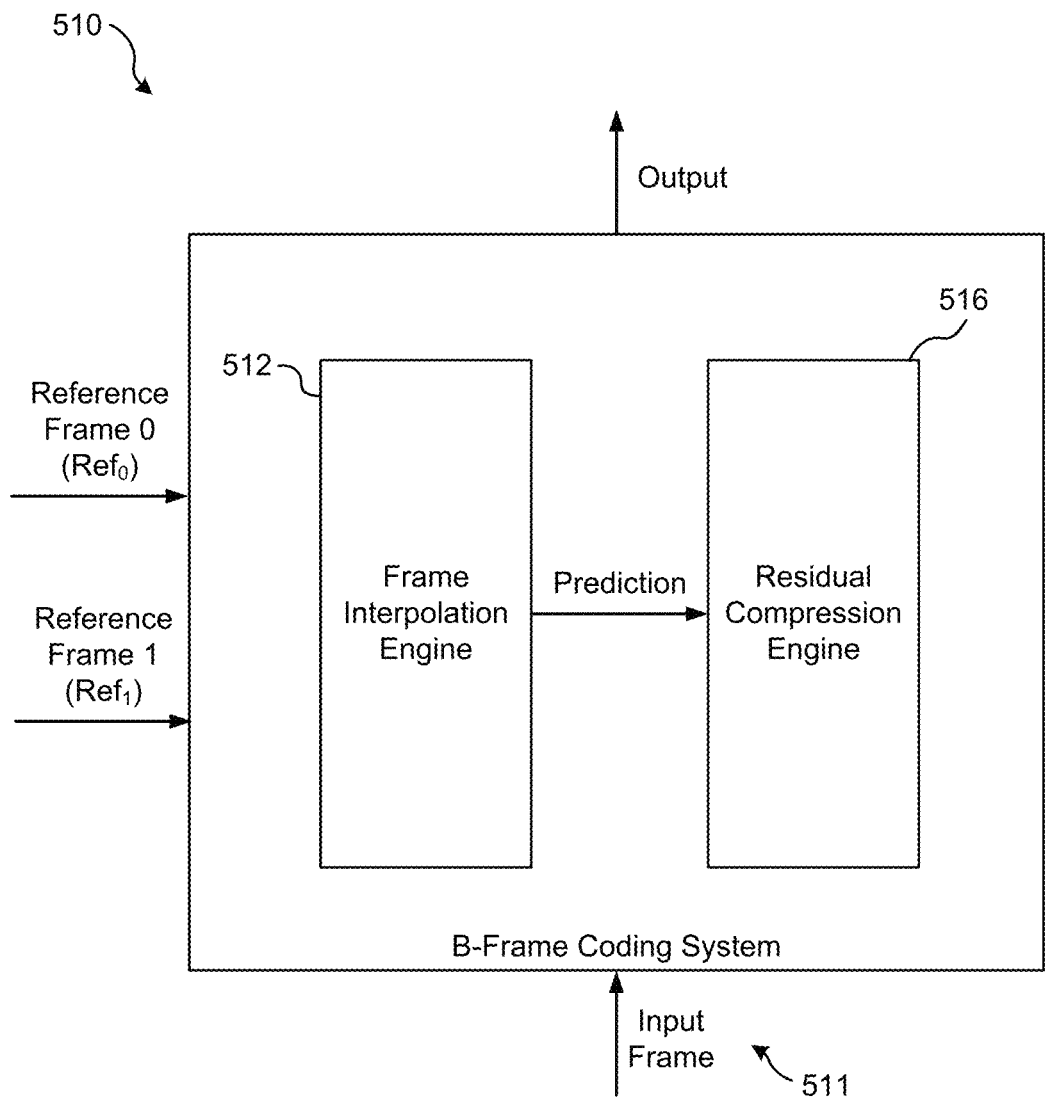
FIG. 5B is a diagram illustrating an example of a B-frame coding system configured to generate a prediction using frame interpolation, in accordance with some examples of the disclosure.

FIG. 5B is a diagram illustrating another example of a B-frame coding system 510. The components of the B-frame coding system 510 include a frame interpolation engine 512 and a residual compression engine 516. The components of the B-frame coding system 500 can include one or more neural networks configured to perform bi-prediction using the frame interpolation engine 512 and the residual compression engine 516.

Similar to the B-frame coding system 500 of FIG. 5A, the B-frame coding system 510 can perform the bi-prediction based on two reference frames (denoted as reference frame 0 ($Ref_0$) and reference frame 1 ($Ref_1$)). However, the interpolation engine 512 can generate a prediction of an input frame 511 by performing an interpolation between the reference frame $Ref_0$ and the reference frame $Ref_1$. The prediction can then be output to the residual compression engine 516. The residual compression engine 506 can generate a predicted residual representing a difference between the prediction and the input frame 511. The B-frame coding system 510 can combine the predicted residual with the merged prediction to generate a reconstructed input frame. The B-frame coding system 510 can output the reconstructed input frame for storage, display, etc.

The above described B-frame coding systems of FIG. 5A and FIG. 5B can be suboptimal in some cases. For example, the B-frame coding system 500 of FIG. 5A performs bidirectional motion compression to generate two motion predictions based on the two reference frames $Ref_0$ and $Ref_1$ and the input frame 511. The B-frame coding system 500 modifies both reference frames $Ref_0$ and $Ref_1$ based on the two motion predictions, and then merges the modified frames to generate the prediction for the input frame 511. Such a process involves many computations during training and inference (after the machine learning system is trained and is being used to process input video data). Further, separate neural networks (with different parameters, such as weights, biases, etc.) are needed for the separate B-frame coding system (of FIG. 5A or FIG. 5B) and P-frame coding system (of FIG. 4). Training the machine learning systems 500 and 510 of FIG. 5A and FIG. 5B also requires a large amount of training data (e.g., two reference frames for each prediction). Further, the B-frame coding system 510 of FIG. 5B determines an interpolation that is only accurate under a linear motion assumption, and the prediction may not be aligned with the input frame. In some cases, a non-linear frame interpolator can be used by the B-frame coding system 510; however, misalignments may still occur in such cases. The B-frame coding system 510 solely relies on residuals to compensate for the misalignments.

As noted above, systems and techniques are described herein for performing learned B-frame coding using a P-frame coding system and interpolated reference frames. The systems and techniques described herein can efficiently and intelligently predict bidirectionally-predicted frames (B-frames) using a reference frame interpolated from reference frames (e.g., interpolated using motion information, such as optical flow information). The systems and techniques can enable efficient, high quality video coding with lower resource demands, such as lower computation and bandwidth demands. For example, when a neural network is used for the P-frame coding system, a single set of neural network parameters (e.g., the weights, biases, etc.) are needed for the P-frame coding system to perform bi-prediction (of B-frames) and to perform uni-prediction (of P-frames). Further, only a single set of motion information is needed for bi-prediction of each B-frame, due to only a single reference frame (the interpolated reference frame) being used to perform the bi-prediction. In some cases, less training data may also be needed to train the machine learning systems (e.g., neural networks), such as compared to the training data needed to train the B-frame coding system 500 of FIG. 5B.

The B-frame coding system 600 also provides improved rate-distortion performance, such as compared to the B-frame coding system 500 of FIG. 5A and the B-frame coding system 510 of FIG. 5B. For instance, for a given input frame, when reference frames from both past (e.g., $Ref_0$) and future (e.g., $Ref_1$) are available, under a linear motion assumption for instance, the B-frame coding system 600 can determine a rough prediction of the input frame 611 by linearly interpolating the two reference frames. This prediction consumes zero bits, as the two reference frames are already available and no motion field or other information is required to perform the interpolation. The B-frame coding system 500 of FIG. 5A, which uses bidirectional motion (e.g., flow or warping), does not take advantage of such information and sends the motion information (e.g., optical flows) with respect to both reference frames (e.g., as if the decoder/receiver is unaware of object motion). As noted above, with respect to the B-frame coding system 510 of FIG. 5B, the interpolation outcome of the frame interpolation engine 512 is only accurate under a linear motion assumption. In such systems, the prediction may not be aligned with the input frame. Even when a non-linear frame interpolator is employed, misalignments may still occur. In these situations, the coding system solely relies on residuals to compensate for the misalignments. As a result, coding efficiency of such coding systems could severely degrade, as compared to the B-frame coding system 600 of FIG. 6 that can correct the misalignment using inexpensive side-information (e.g., the interpolation between the reference frames) and can then use the residual to determine the reconstructed input frame.

Figure 6:
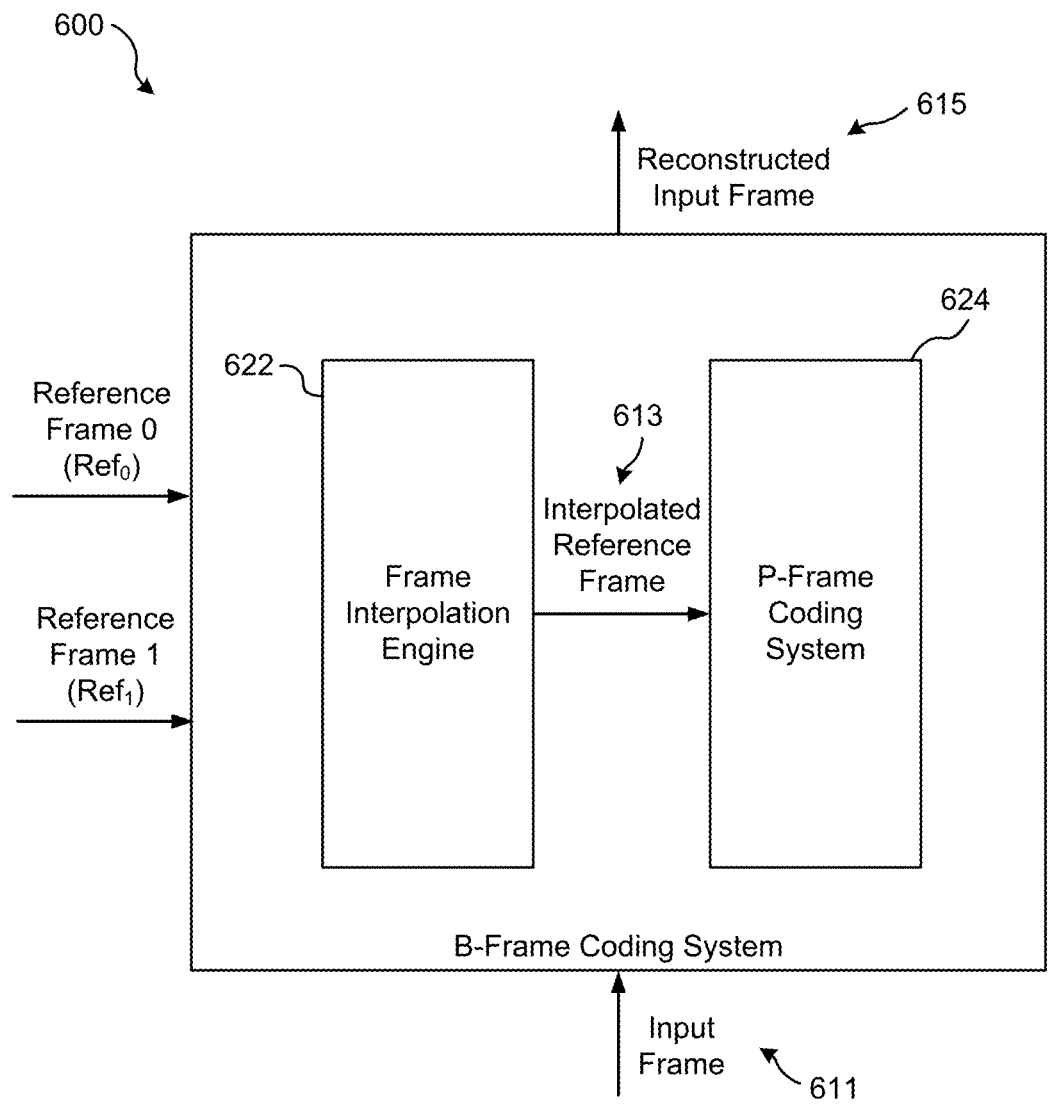
FIG. 6 is a diagram illustrating an example of a B-frame coding system configured to perform learned B-frame coding using a P-frame coding system and a frame interpolation engine, in accordance with some examples of the disclosure.

FIG. 6 is a diagram illustrating an example of a B-frame coding system 600 configured to perform learned B-frame coding. The B-frame coding system 600 includes various components that are used to process video data. As shown, the components of the B-frame coding system 600 include a frame interpolation engine 622 and a P-frame coding system 624. Using the frame interpolation engine 622 and the P-frame coding system 624, the B-frame coding system 600 can perform bidirectional inter-prediction (bi-prediction) of an input frame 611 to generate a reconstructed version (or decoded version) of the input frame 611, referred to as a reconstructed input frame 615. The frame interpolation engine 622 can generate an interpolated reference frame 613 based on processing a reference frame 0 ($Ref_0$) and a reference frame 1 ($Ref_1$). The frame interpolation engine 622 can utilize any type of interpolation technique. In some examples, the frame interpolation engine 622 can generate the interpolated reference frame 613 using motion information associated with the reference frames $Ref_0$ and $Ref_1$. For instance, as described with reference to FIG. 7C, the frame interpolation engine 622 can determine the interpolated reference frame 615 based on bidirectional motion information (e.g., forward optical flow and backward optical flow) determined for the reference frame $Ref_0$ and the reference frame $Ref_1$. In some cases, the interpolated reference frame 615 can be stored, such as for use as a reference frame by one or more other input frames.

The B-frame coding system 600 can use the P-frame coding system 624 to generate the reconstructed input frame 615 (as a B-frame). For instance, as shown in FIG. 6, the P-frame coding system 624 can use the interpolated reference frame 613 as input to generate the reconstructed input frame 615. Any type of P-frame coding technique can be used by the P-frame coding system 624. In some examples, the P-frame coding system 624 can include at least one machine learning based video encoder and at least one machine learning based video decoder to process the interpolated reference frame 613 and the input frame 611 to generate the reconstructed input frame 615. In some implementations, as described below with respect to FIG. 7A and FIG. 7B, the P-frame coding system 624 can include a motion neural network system having an encoder neural network and a decoder neural network. The motion neural network system can include any type of neural network structure, such as an autoencoder, a convolutional neural network (CNN), and/or other neural network structure. The encoder neural network of the motion neural network system can generate latent data that represents motion data for the input frame 611. The decoder neural network of the motion neural network system can reconstruct the motion from the latent data to generate predicted motion for the input frame 611. The P-frame coding system 624 can use the predicted motion to warp the interpolated reference frame 613 to generate a prediction of the input frame 611.

The P-frame coding system 624 can also include a residual neural network system that includes an encoder neural network and a decoder neural network. The residual neural network system can include any type of neural network structure, such as an autoencoder, a CNN, and/or other neural network structure. The P-frame coding system 624 can generate a residual for the input frame 611, such as by determining a difference between the warped interpolated reference frame 613 (warped using the predicted motion) and the input frame 611. The encoder neural network of the residual neural network system can process the residual to generate residual latent data representing the residual. The decoder neural network of the residual neural network system can reconstruct the residual from the residual latent data to generate a predicted residual for the input frame 611. The P-frame coding system 624 can generate the reconstructed input frame 615 by adding the predicted residual to the warped interpolated reference frame 613.

In some examples, the P-frame coding system 624 can be used to perform bi-prediction (to generate B-frames) and can also be used to perform uni-prediction (to generate P-frames). For instance, the P-frame coding system 624 can be used to generate P-frames when a uni-prediction coding mode is determined to be performed for an input frame, and can be used to generate B-frames when a bi-prediction coding mode is determined to be performed for an input frame. Details regarding selection of different coding modes (e.g., intra-prediction, uni-prediction, or bi-prediction) for certain frames are described with respect to FIG. 9-FIG. 12. When a uni-prediction mode is selected for an input frame, the P-frame coding system 624 can process an actual reference frame (e.g., the reference frame $Ref_0$ or the reference frame $Ref_1$) to generate a reconstructed frame as a P-frame. Details regarding use of the P-frame coding system 624 for uni-prediction are described below with respect to FIG. 7A. When a bi-prediction mode is selected for an input frame, the P-frame coding system 624 can process an interpolated reference frame (e.g., the interpolated reference frame 613) to generate a reconstructed frame as a B-frame. Details regarding use of the P-frame coding system 624 for bi-prediction are described below with respect to FIG. 7B.

While the B-frame coding system 600 is shown to include certain components, one of ordinary skill will appreciate that the B-frame coding system 600 can include more components than those shown in FIG. 6. In some cases, additional components of the B-frame coding system 600 can include software, hardware, or one or more combinations of software and hardware. For example, in some cases, the B-frame coding system 600 can include one or more display devices, one or more other processing engines, one or more image sensors (e.g., cameras), one or more other sensors (e.g., one or more inertial measurement units (IMUs), radars, light detection and ranging (LIDAR) sensors, audio sensors, etc.), and/or one or more wireless transceivers (or separate wireless receivers and transmitters) for wireless communications, such as cellular network communications (e.g., using Long Term Evolution (LTE) protocols, 5G/New Radio (NR) protocols, or other cellular protocols), wireless local area network (WLAN) communications (e.g., using 802.11 Wi-Fi protocols), Bluetooth or other short-range communications, any combination thereof, and/or other communications. One of ordinary skill will appreciate that the B-frame coding system 600 can include one or more other software and/or hardware components that are not shown in FIG. 6.

In some implementations, additional components of the B-frame coding system 600 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the B-frame coding system 600.

The B-frame coding system 600 can include or be part of a computing device. For example, the computing device can include or be part of a mobile or stationary telephone handset (e.g., smartphone, cellular telephone, or the like), an extended reality device (e.g., a virtual reality (VR) device, an augmented reality (AR) device, and/or a mixed reality device), an image capture device (e.g., a camera), a vehicle, a display device, a server computer (e.g., in communication with a vehicle computing system), a desktop computer, a laptop or notebook computer, a tablet computer, a set-top box, a television, a digital media player, a video streaming device, or any other suitable computing device.

Figure 7A:
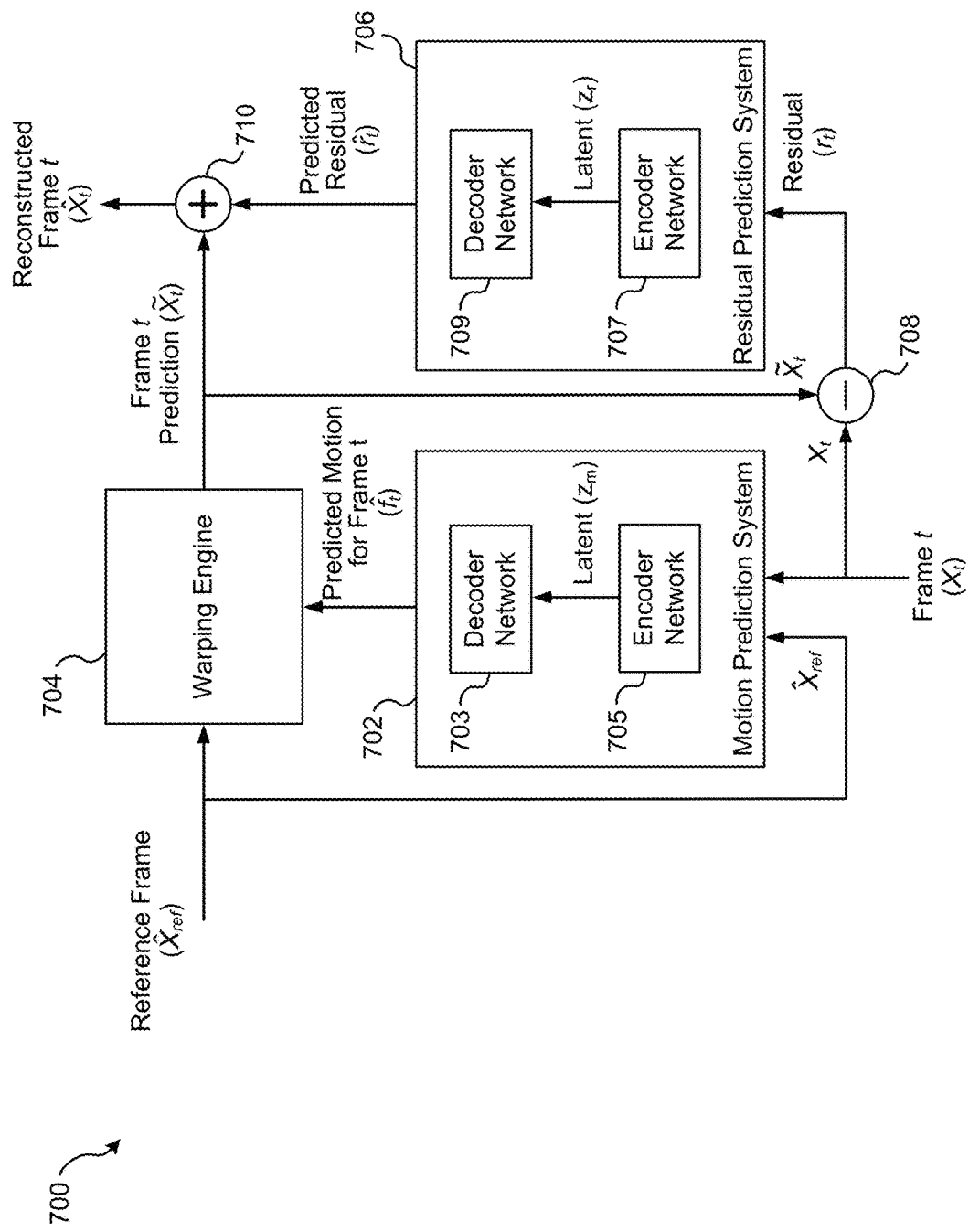
FIG. 7A is a diagram illustrating an example of a P-frame coding system that can be used to perform unidirectional coding and/or bidirectional coding, in accordance with some examples of the disclosure.

FIG. 7A is a diagram illustrating an example of a P-frame coding system 700 that can be used to perform unidirectional coding of P-frames and/or bidirectional coding of B-frames. The P-frame coding system 700 is an illustrative example of the P-frame coding system 624 of FIG. 6. The P-frame coding system 700 includes a motion prediction system 702, a warping engine 704, and a residual prediction system 706. The motion prediction system 702 and the residual prediction system 706 can include any type of machine learning system (e.g., using one or more neural networks). In one illustrative example, the motion prediction system 702 includes a motion autoencoder and the residual prediction system 706 includes a residual autoencoder. While the P-frame coding system 700 of FIG. 7A is shown to include certain components, one of ordinary skill will appreciate that the P-frame coding system 700 can include fewer or more components than those shown in FIG. 7A.

For a given time t, the P-frame coding system 700 receives an input frame (denoted as frame $X_t$) and a reference frame $\hat{X}_{ref}$. The reference frame $\hat{X}_{ref}$ is a previously-reconstructed frame (as noted by the hat symbol "$\hat{\ }$") generated prior to time t. For instance, the input frame $X_t$ is a current frame at time t, and the reference frame $\hat{X}_{ref}$ can be a past frame reconstructed or generated at time t-n (e.g., temporally or sequentially before the input frame $X_t$ at time t), where n is an integer value greater than or equal to 1. In one illustrative example, the reference frame $\hat{X}_{ref}$ can be a frame temporally or sequentially immediately prior to the input frame $X_t$, in which case the reference frame $\hat{X}_{ref}$ can be denoted as $\hat{X}_{t-1}$. In some cases, the reference frame $\hat{X}_{ref}$ is received from a decoded picture buffer (DPB) of the coding system.

In some cases, the input frame $X_t$ can be a P-frame and the reference frame $\hat{X}_{ref}$ can be an I-frame, a P-frame, or a B-frame. For instance, the reference frame $\hat{X}_{ref}$ can be reconstructed or generated by an I-frame coding system (e.g., which can be part of a device which includes the P-frame coding system 700 or a different device than that which includes the P-frame coding system 700), by the P-frame coding system 700 (or a P-frame coding system of a device other than that which includes the P-frame coding system 700), or by a B-frame coding system (e.g., the B-frame coding system 600 of FIG. 6, the B-frame coding system 720 of FIG. 7B, or a B-frame coding system of a different device than that which includes the P-frame coding system 700). In some cases, the reference frame $\hat{X}_{ref}$ can be selected according to a group of pictures (GoP) structure shown in FIG. 9 or FIG. 10 and/or according to a sequential scheme (e.g., the sequential scheme shown in FIG. 11) or a hierarchical scheme (e.g., the hierarchical scheme shown in FIG. 12), or based on any other scheme.

The motion prediction system 702 receives the reference frame $\hat{X}_{ref}$ and the input frame $X_t$. The motion prediction system 702 can determine motion (e.g., represented by vectors, such as optical flow motion vectors) between pixels of the reference frame $\hat{X}_{ref}$ and pixels of the input frame $X_t$. The motion prediction system 702 can then encode and in some cases decode the motion as predicted motion $\hat{f}_t$ for the input frame $X_t$. For example, an encoder network 705 of the motion prediction system 702 can determine motion between the current frame $X_t$ and the reference frame $\hat{X}_{ref}$. The encoder network 705 can encode the motion into a latent representation (denoted as latent $z_m$). In some examples, the encoder network 705 can map the motion to latent code, which can be used as the latent $z_m$. In some cases, the encoder network 705 can convert the latent $z_m$ into a bitstream by performing entropy coding on the latent code. In some examples, the encoder network 705 can quantize the latent $z_m$ (e.g., prior to entropy coding being performed on the latent code). The quantized latent $z_m$ can include a quantized representation of the residual $z_m$. In some cases, the latent $z_m$ can include neural network data (e.g., a neural network node's activation map or feature map) that represents quantized codes. The encoder network 705 can store the latent $z_m$, send the latent $z_m$ to a decoder network 703 of the motion prediction system 702, and/or can send the latent $z_m$ to another device or system that can decode the latent. Upon receiving the latent $z_m$, the decoder network 703 can decode (e.g., inverse entropy code, dequantize, and/or reconstruct) the latent $z_m$ to generate a predicted motion $f_t$ between pixels of the reference frame $\hat{X}_{ref}$ and pixels of the input frame $X_t$. The encoder network 705 and the decoder network 703 can be trained and optimized using training data (e.g., training images or frames) and one or more loss functions, as described below.

In some examples, the predicted motion $\hat{f}_t$ can include optical flow data (e.g., an optical flow map including one or more displacement vectors), dynamic convolution data (e.g., a matrix or kernel for data convolution), or block-based motion data (e.g., a motion vector for each block), as described below with respect to FIG. 8. For instance, in some cases, the predicted motion $\hat{f}_t$ can include an optical flow map. In one illustrative example, the optical flow map can include a motion vector for each pixel of the input frame $X_t$ (e.g., a first motion vector for a first pixel, a second motion vector for a second pixel, and so on). The motion vectors represent the motion for the pixels in the current frame $X_t$ relative to the corresponding pixels in the reference frame $\hat{X}_{ref}$.

The warping engine 704 of the P-frame coding system can obtain the motion prediction $\hat{f}_t$ output by the motion prediction system 702. For example, the warping engine 704 can retrieve the motion prediction $\hat{f}_t$ from storage or can receive the motion prediction $\hat{f}_t$ from the motion prediction system 702. The warping engine 704 can use the motion prediction $\hat{f}_t$ to warp (e.g., by performing motion compensation) the pixels of the reference frame $\hat{X}_{ref}$, resulting in the generation of a warped frame $\tilde{X}_t$. For instance, the pixels of the reference frame can be moved to new locations or otherwise modified according to the reconstructed motion estimation data $\hat{f}_t$. In one illustrative example where optical flow is used to determine the motion between pixels of the reference frame $\hat{X}_{ref}$ and pixels of the input frame $X_t$, the warping engine 704 can move the pixels of the reference frame $\hat{X}_{ref}$ by an amount indicated by the motion vectors of the optical flow map, resulting in the warped frame $\tilde{X}_t$. As noted above, other motion based techniques can also be used to determine the motion prediction $\hat{f}_t$ for warping the reference frame $\hat{X}_{ref}$ (e.g., dynamic convolution data, block-based motion data, etc.).

As noted above, to generate the warped frame $\tilde{X}_t$, the P-frame coding system 700 can perform motion compensation by predicting the motion $\hat{f}_t$ (e.g., optical flow or other motion) between $X_t$ and $\hat{X}_{ref}$ and warping the reference frame $\hat{X}_{ref}$ using the motion prediction $\hat{f}_t$. However, the frame prediction $\tilde{X}_t$ based on the motion prediction $f_t$ may not be accurate enough to represent the input frame $X_t$ as a reconstructed frame $\hat{X}_t$. For example, there may be one or more occluded areas in a scene depicted by the input frame $X_t$, excessive lighting, lack of lighting, or other effect that results in the frame prediction $\tilde{X}_t$ not being accurate enough to be used as the reconstructed frame $\hat{X}_t$.

The residual prediction system 706 can be used to correct the prediction of $\tilde{X}_t$ and to generate the reconstructed frame $\hat{X}_t$ that represents the frame $X_t$. As shown in FIG. 7A, a residual $r_t$ can be determined by subtracting (determined using subtraction operation 708) the predicted frame $\tilde{X}_t$ from the input frame $X_t$. For instance, once the predicted frame $\tilde{X}_t$ is determined by the warping engine 704, the P-frame coding system 700 can determine the residual $r_t$ by determining the difference (using subtraction operation 708) between the predicted frame $\tilde{X}_t$ and the input frame $X_t$. An encoder network 707 of the residual prediction system 706 can encode the residual $r_t$ into a latent $z_r$ that represents the residual $r_t$. In some examples, the encoder network 707 can map the residual $r_t$ to latent code, which can be used as the latent $z_r$. In some cases, the encoder network 707 can convert the latent $z_r$ into a bitstream by performing entropy coding on the latent code. In some examples, the encoder network 707 can also quantize the latent $z_r$ (e.g., before entropy coding is performed). The quantized latent $z_r$ can include a quantized representation of the residual $r_t$. In some cases, the latent $z_r$ can include neural network data (e.g., a neural network node's activation map or feature map) that represents quantized codes. The encoder network 707 can store the latent $z_r$, send the latent $z_r$ to a decoder network 709 of the residual prediction system 706, and/or can send the latent $z_r$ to another device or system that can decode the latent $z_r$. Upon receiving the latent $z_r$, the decoder network 709 can decode the latent $z_r$ (e.g., inverse entropy code, dequantize, and/or reconstruct) to generate a predicted residual $\hat{r}_t$. The encoder network 707 and the decoder network 709 can be trained and optimized using training data (e.g., training images or frames) and one or more loss functions, as described below.

The predicted residual $\hat{r}_t$ can be used with the frame prediction $\tilde{X}_t$ from the warping engine 704 to generate a reconstructed frame $\hat{X}_t$ representing the input frame $X_t$ at time t. For instance, the P-frame coding system 700 can add (using addition operation 710) the predicted residual $\hat{r}_t$ to the frame prediction $\tilde{X}_t$ to generate the reconstructed frame $\hat{r}_t$. In some cases, the decoder network 709 of the residual prediction system 706 can add the predicted residual $\hat{r}_t$ to the frame prediction $\tilde{X}_t$. The reconstructed frame $\hat{X}_t$ can also be referred to as a decoded frame. The reconstructed current frame $\hat{X}_t$ can be output for storage (e.g., in a decoded picture buffer (DPB) or other storage), transmission, display, for further processing (e.g., as a reference frame in further inter-predictions, for post-processing, etc.), and/or for any other use.

As noted above, in some cases, the P-frame coding system 700 can transmit the latent data representing the motion (the latent $z_m$) and the latent data representing the residual (the latent $z_r$) in a bitstream to another device for decoding. For instance, the other device can include a video decoder (e.g., a motion prediction system 702 and a residual prediction system 706, as described above, or another decoder configured to decode the latents $z_m$ and $z_r$) that can decode the predicted motion $\hat{f}_t$ from the latent $z_m$ and the predicted residual $\hat{r}_t$ from the latent $z_r$, and that can generate the reconstructed frame $\hat{X}_t$ based on the predicted motion $\hat{f}_t$ and the predicted residual $\hat{r}_t$ (e.g., by adding the predicted residual $\hat{r}_t$ to the frame prediction $\tilde{X}_t$ generated using the predicted motion $\hat{f}_t$, as described above).

In some examples, the motion prediction system 702 and/or the residual prediction system 706 can be trained and optimized using training data and one or more loss functions. In some cases, the motion prediction system 702 and/or the residual prediction system 706 can be trained in an end-to-end manner (where all neural network components are trained during the same training process). In some aspects, the training data can include training images or frames. In some cases, a loss function Loss can be used for the training based on the motion prediction system 702 and/or the residual prediction system 706 processing the training images or frames. In one example, the Loss can be defined as Loss=D+βR, where D is a distortion between a frame (e.g., the input frame $X_t$) and its reconstructed frame (e.g., D(frame $X_t$, frame $\hat{X}_t$)), β is a hyper parameter that controls a bitrate (bits per pixel), and R is the number of bits used to convert the residual (e.g., residual $r_t$) to a compressed bitstream (e.g., latent $z_r$). In some examples, the distortion D can be calculated based on a peak signal-to-noise ratio (PSNR), a structural similarity index measure (SSIM), a multiscale SSIM (MS-SSIM), and/or the like. Using the training data and the loss function, the parameters (e.g., weights, biases, etc.) of the motion prediction system 702 and/or the residual prediction system 706 can be tuned until a desired coding result is achieved by the P-frame coding system 700.

Figure 7B:
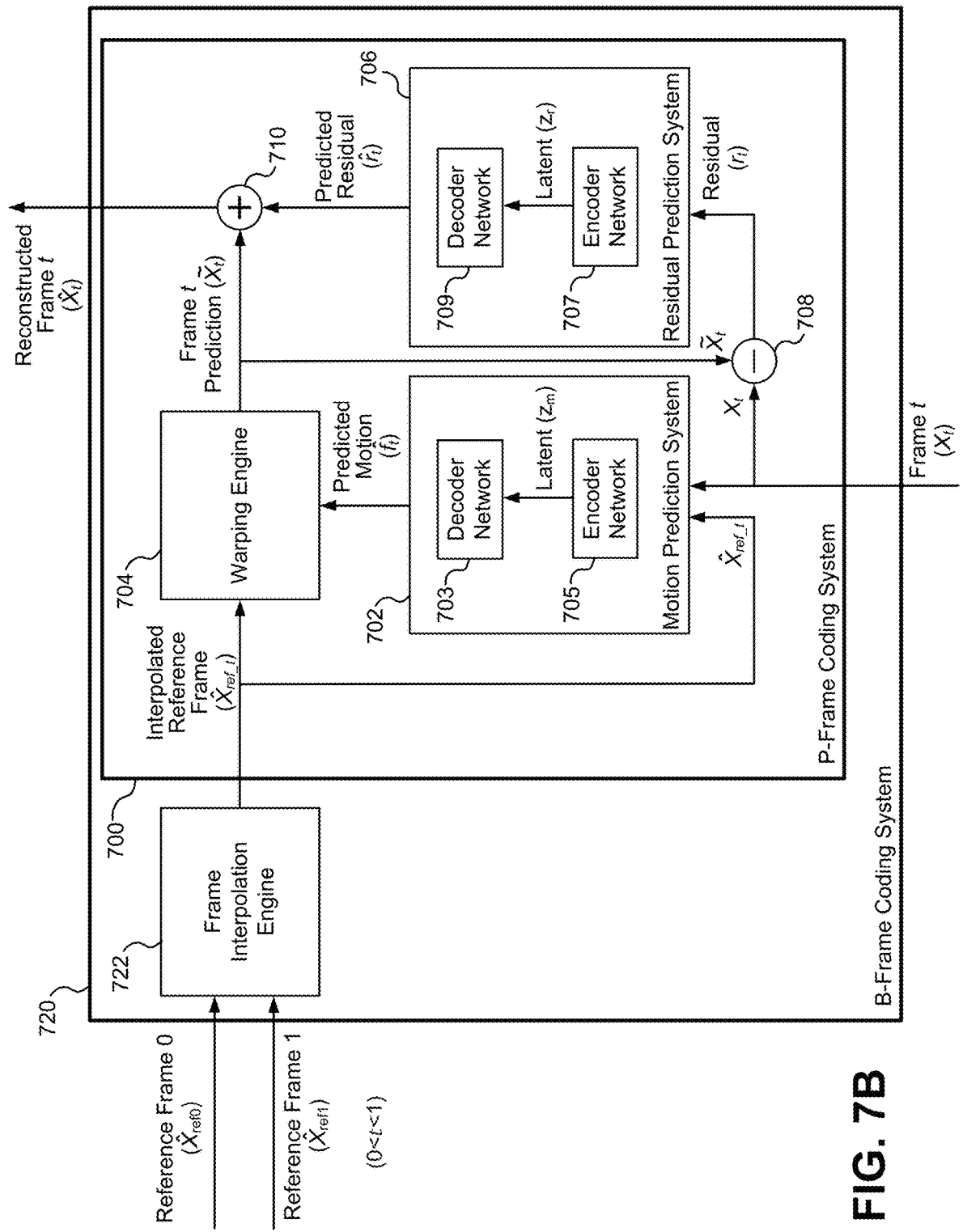
FIG. 7B is a diagram illustrating an example of a B-frame coding system that can be used to perform bidirectional coding using a P-frame coding system, in accordance with some examples of the disclosure.

FIG. 7B is a diagram illustrating an example of a B-frame coding system 720 that can be used to perform bidirectional coding using the P-frame coding system 700 of FIG. 7A. The B-frame coding system 720 also includes a frame interpolation engine 722. While the B-frame coding system 720 is shown to include certain components, one of ordinary skill will appreciate that the B-frame coding system 720 can include fewer or more components than those shown in FIG. 7B.

The interpolation engine 722 can obtain two reference frames, denoted as $\hat{X}_{ref_0}$ and $\hat{X}_{ref_1}$. As shown, the P-frame coding system 700 obtains an input frame $X_t$ at time t, similar to that described above with respect to FIG. 7A. The input frame $X_t$ can be a frame temporally or sequentially after reference frame $\hat{X}_{ref_0}$ and before reference frame $\hat{X}_{ref_1}$. In some examples, the input frame $X_t$ can be a current frame at time t, the reference frame $\hat{X}_{ref_0}$ can be a past frame (e.g., temporally or sequentially before the input frame $X_t$ at time t) at time t-n, and the reference frame $\hat{X}_{ref_1}$ can be a future frame (e.g., temporally or sequentially after the input frame $X_t$) at time t+m, where n and m can represent the same or different values. In one illustrative example, the reference frame $\hat{X}_{ref_0}$ can be a frame immediately prior to the input frame $X_t$ at time t−1 and the reference frame can be a frame immediately after the input frame $X_t$ at time t+1.

In some cases, the input frame $X_t$ can be a B-frame, and each of the reference frames $\hat{X}_{ref_0}$ and $\hat{X}_{ref_1}$ can be an I-frame, a P-frame, or a B-frame. For example, reference frame $\hat{X}_{ref_0}$ can be an I-frame, a P-frame, or a B-frame and reference frame can be an I-frame, a P-frame, or a B-frame. In some cases, both the reference frames $\hat{X}_{ref_0}$ and can be a same type of frame, such as a B-frame, a P-frame, or an I-frame. In other cases, reference frame $\hat{X}_{ref_0}$ and reference frame can be different types of frames. For example, the reference frame $\hat{X}_{ref_0}$ can be an I-frame and reference frame can be a P-frame. In some cases, the reference frames $\hat{X}_{ref_0}$ and $\hat{X}_{ref_1}$ can be selected according to a group of pictures (GoP) structure shown in FIG. 9 or FIG. 10 and/or according to a sequential scheme (e.g., the sequential scheme shown in FIG. 11) or a hierarchical scheme (e.g., the hierarchical scheme shown in FIG. 12), or based on any other scheme.

The interpolation engine 722 can perform an interpolation operation on the two reference frames $\hat{X}_{ref_0}$ and $\hat{X}_{ref_1}$ to generate an interpolated reference frame $\hat{X}_{ref_t}$. For example, in some cases, the interpolation is performed to generate an entire reference frame (e.g., not only parts of frames, such as block of pixels) that can be used as a reference for the input frame $X_t$. The interpolated reference frame $\hat{X}_{ref_t}$ can be stored and/or output to the P-frame coding system 700. The frame interpolation engine 722 can perform any type of interpolation to generate the interpolated reference frame $\hat{X}_{ref_t}$ using the reference frame $\hat{X}_{ref_0}$ and the reference frame $\hat{X}_{ref_1}$. Examples of interpolation techniques that can be performed by the frame interpolation engine 722 can include, for example and without limitation, frame interpolation based on optical flows, moving gradients methods, phase-based methods, kernel-based methods, and/or any other frame interpolation technique. In one illustrative example, to generate the interpolated reference frame $\hat{X}_{ref_t}$, the frame interpolation engine 722 can calculate motion estimation information (e.g., optical flow information, such as optical flow maps, also referred to as motion vector maps), for reference frame $\hat{X}_{ref_0}$ and reference frame $\hat{X}_{ref_1}$. The frame interpolation engine 722 can interpolate the motion estimation information (e.g., the flow maps) to determine a motion estimation (e.g., an optical flow) for a time t associated with the interpolated reference frame $\hat{X}_{ref_t}$. The frame interpolation engine 725 can use the interpolated motion estimation information (e.g., the interpolated optical flow) and the reference frames $\hat{X}_{ref_0}$ and $\hat{X}_{ref_1}$ to generate the interpolated reference frame $\hat{X}_{ref_t}$ (e.g., at least in part by warping the reference frames $\hat{X}_{ref_0}$ and $\hat{X}_{ref_1}$).

In some examples, the frame interpolation engine 722 can determine motion estimation information (e.g., optical flow information) on a pixel-by-pixel basis. For instance, the frame interpolation engine 722 can map each pixel in the reference frame $\hat{X}_{ref_0}$ (or a subset of pixels in the reference frame $\hat{X}_{ref_0}$) to the location of the corresponding pixel in the reference frame $\hat{X}_{ref_1}$ (or a corresponding subset of pixels in the reference frame $\hat{X}_{ref_1}$), and vice versa (e.g., in both directions). In one example, the motion estimation information (e.g., optical flow information) for each pixel can include a vector indicating a movement of the pixel between the reference frames $\hat{X}_{ref_0}$ and $\hat{X}_{ref_1}$ (e.g., movement of a pixel from reference frame $\hat{X}_{ref_0}$ to reference frame $\hat{X}_{ref_1}$ and/or movement of a pixel from reference frame $\hat{X}_{ref_1}$ to reference frame $\hat{X}_{ref_0}$). In some examples, optical flow maps can be generated based on the optical flow vectors between the reference frames $\hat{X}_{ref_0}$ and $\hat{X}_{ref_1}$. The optical flow maps can include an optical flow vector for each pixel in a frame, where each vector indicates a movement of a pixel between the frames.

In one illustrative example, the optical flow vector for a pixel can be a displacement vector (e.g., indicating horizontal and vertical displacements, such as x- and y-displacements) showing the movement of a pixel from a first frame to a second frame. In some cases, the frame interpolation engine 722 can calculate a two-dimensional (2D) flow map (e.g., indicating horizontal and vertical displacements) for the reference frame $\hat{X}_{ref_0}$ and a 2D flow map for the reference frame $\hat{X}_{ref_1}$. In some aspects, the frame interpolation engine 722 can merge the 2D flow maps to generate a three-dimensional (3D) flow map for the interpolated reference frame $\hat{X}_{ref_t}$. The 3D flow map can include a horizontal dimension and a vertical dimension indicating horizontal and vertical displacements, respectively, and a frame dimension including a frame index identifying a frame to which the horizontal and vertical displacements apply. For example, if the frame dimension identifies reference frame $\hat{X}_{ref_0}$, the horizontal and vertical dimensions can indicate the horizontal and vertical displacements for the pixels in the reference frame $\hat{X}_{ref_0}$ (e.g., how much the pixels in reference frame should be moved based on the optical flow information).

The frame interpolation engine 722 can use the interpolated optical flow (e.g., the 3D flow map) to warp the reference frame $\hat{X}_{ref_0}$ and the reference frame $\hat{X}_{ref_1}$ to the specific time step (e.g., time t) of the input frame $X_t$ and can fuse the warped frames to generate the interpolated reference frame $\hat{X}_{ref_t}$. Further details of such an example implementation of a frame interpolation engine are described below with respect to FIG. 7C.

Using the interpolated reference frame $\hat{X}_{ref_t}$ and the input frame $X_t$ as input, the P-frame coding system 700 can perform the same or similar operations as those described above with respect to FIG. 7A to generate the reconstructed frame $\hat{X}_t$. For example, the encoder network 705 of the motion prediction system 702 can determine motion between the input frame $X_t$ and the interpolated reference frame $\hat{X}_{ref_t}$ and can encode the motion into the latent $z_m$. The decoder network 703 of the motion prediction system 702 can decode the latent $z_m$ to generate the predicted motion $\hat{f}_t$. The warping engine 704 can modify the pixels (e.g., by performing motion compensation) of the interpolated reference frame $\hat{X}_{ref_t}$ using the predicted motion $\hat{f}_t$, as described above with respect to FIG. 7A, to generate the frame prediction $\tilde{X}_t$. The encoder network 707 of the residual prediction system 706 can obtain the residual $r_t$ (determined as the difference between the frame prediction $\tilde{X}_t$ and the input frame $X_t$) and can encode the residual $r_t$ into the latent $z_r$. The decoder network 709 of the residual prediction system 706 can decode the latent $z_r$ to generate the predicted residual $\hat{r}_t$. The B-frame coding system 720 can then add the frame prediction $\tilde{X}_t$ to the predicted residual $\hat{r}_t$ to generate the reconstructed frame $\hat{X}_t$.

Figure 7C:
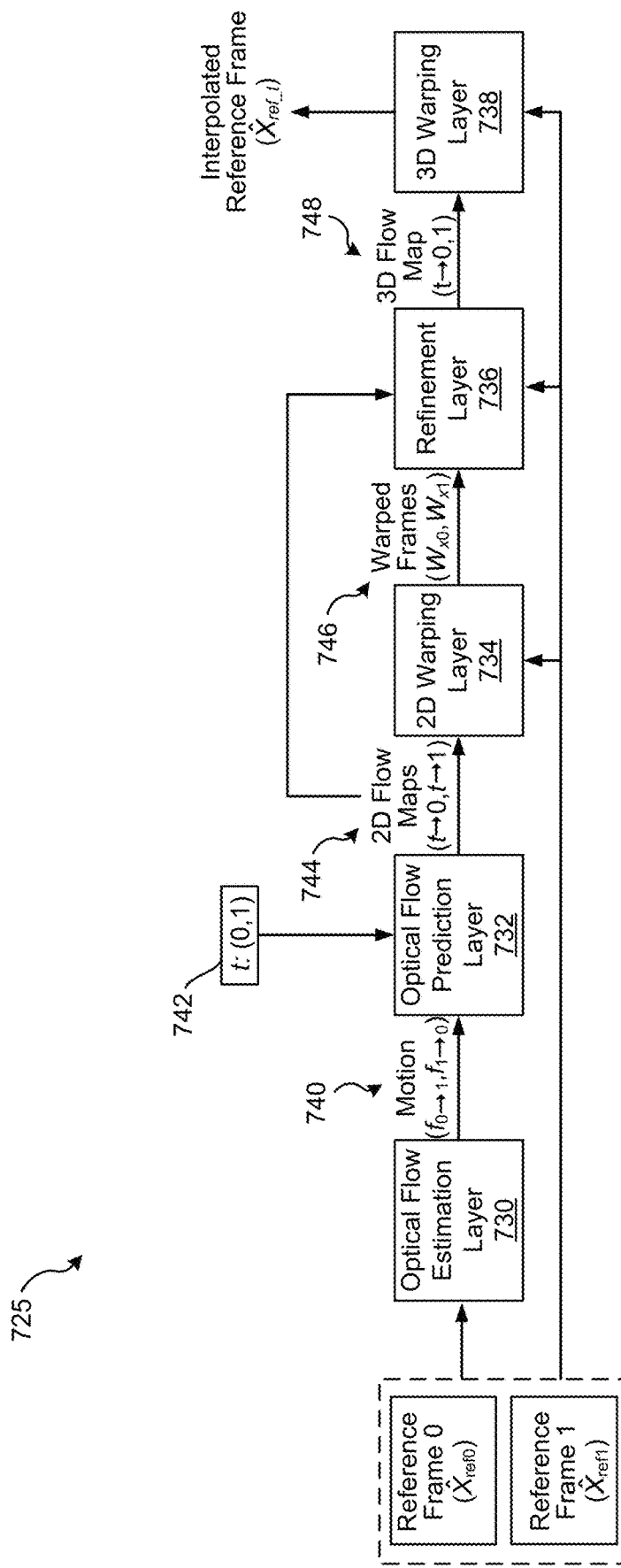
FIG. 7C is a diagram illustrating an example of a frame interpolation engine that can be used by a B-frame coding system, in accordance with some examples of the disclosure.

FIG. 7C is a diagram illustrating a system flow of an example frame interpolation engine 725 that can be used by a B-frame coding system. The frame interpolation engine 725 is an illustrative example of the frame interpolation engine 722 of FIG. 7B. In the example of FIG. 7C, the frame interpolation engine 725 includes an optical flow estimation layer 730, an optical flow prediction layer 732, a 2D warping layer 734, a refinement layer 736, and a 3D warping layer 738.

As shown in FIG. 7C, a reference frame $\hat{X}_{ref_0}$ and a reference frame $\hat{X}_{ref_1}$ are input to an optical flow estimation layer 730. In some examples, the optical flow estimation layer 730 can include one or more neural networks or other machine learning systems. For instance, the optical flow estimation layer 730 can be implemented using one or more optical flow estimation neural networks. The optical flow estimation layer 730 can use the reference frame $\hat{X}_{ref_0}$ and the reference frame $\hat{X}_{ref_1}$ to estimate bidirectional motion information 740 (e.g., forward optical flow and backward optical flow) for the reference frame $\hat{X}_{ref_0}$ and the reference frame $\hat{X}_{ref_1}$. The bidirectional motion information 740 can include an optical flow or optical flow map from the reference frame $\hat{X}_{ref_0}$ to the reference frame $\hat{X}_{ref_1}$ (denoted as $f_{0 \to 1}$), and an optical flow or optical flow map from reference frame $\hat{X}_{ref_1}$ to reference frame $\hat{X}_{ref_0}$ (denoted as $f_{1 \to 0}$).

For instance, the bidirectional motion information 740 can include an optical flow map $f_{0 \to 1}$ that maps the location of each pixel in the reference frame $\hat{X}_{ref_0}$ (or a subset of pixels in the reference frame $\hat{X}_{ref_0}$) to the location of the corresponding pixel in the reference frame $\hat{X}_{ref_1}$ (or a corresponding subset of pixels in the reference frame $\hat{X}_{ref_1}$). The bidirectional motion information 740 can also include an optical flow map $f_{1 \to 0}$ that maps the location of each pixel in the reference frame $\hat{X}_{ref_1}$ (or a subset of pixels in the reference frame $\hat{X}_{ref_1}$) to the location of the corresponding pixel in the reference frame $\hat{X}_{ref_0}$ (or a corresponding subset of pixels in the reference frame $\hat{X}_{ref_0}$). In some cases, the motion information 740 for each pixel can include a vector indicating a movement of the pixel between the reference frames $\hat{X}_{ref_0}$ and $\hat{X}_{ref_1}$. In some examples, optical flow maps $f_{0 \to 1}$ and $f_{1 \to 0}$ can be generated based on optical flow vectors between the pixels of the reference frames $\hat{X}_{ref_0}$ and $\hat{X}_{ref_1}$. The optical flow maps can include an optical flow vector for each pixel in a frame, where each vector indicates a movement of a pixel between the frames.

The optical flow estimation layer 730 can provide the bidirectional motion information 740 (e.g., $f_{0 \to 1}$ and $f_{1 \to 0}$) to the optical flow prediction layer 732. The optical flow prediction layer 732 can obtain time information 742 indicating a time tin the interval 0 to 1 (e.g., $t \in (0,1)$, where 0 represents a time step of reference frame $\hat{X}_{ref_0}$, 1 represents a time step of reference frame $\hat{X}_{ref_1}$, and time t corresponds to a time step of the frame to be interpolated (e.g., interpolated frame $\hat{X}_{ref_t}$), which also corresponds to the time step of an input frame (e.g., the input frame $X_t$ of FIG. 7B). The optical flow prediction layer 732 can use the bidirectional motion information 740 and the time information 742 to predict 2D optical flow maps 744. In some examples, the optical flow estimation layer 730 can interpolate the bidirectional motion information 740 (e.g., $f_{0 \to 1}$ and $f_{1 \to 0}$) for reference frame $\hat{X}_{ref_0}$ and reference frame $\hat{X}_{ref_1}$, to determine the optical flow at time t. In some cases, the optical flow at time t can be the linear interpolation between $f_{0 \to 1}$ and $f_{1 \to 0}$.

In some examples, the 2D optical flow maps 744 can include an optical flow map (e.g., $\hat{f}_{t \to 0}^{2D}$) from time t to the reference frame $\hat{X}_{ref_0}$ (e.g., to time step 0 of reference frame $\hat{X}_{ref_0}$) and an optical flow map (e.g., $\hat{f}_{t \to 1}^{2D}$) from time t to the reference frame $\hat{X}_{ref_1}$ (e.g., to time step 1 of reference frame $\hat{X}_{ref_1}$). For example, the 2D optical flow maps 744 can include a backward 2D flow map $\hat{f}_{t \to 0}^{2D}$ with motion information from time t to a time series (e.g., time series 0 in the example shown in FIG. 7C) of reference frame $\hat{X}_{ref_0}$ and a forward 2D flow map $f_{t \to 1}^{2D}$ with motion information from time t to a time series (e.g., time series 1 in the example shown in FIG. 7C) of reference frame $\hat{X}_{ref_1}$.

In one illustrative example, the optical flow prediction layer 732 can predict the 2D optical flow maps 744 according to Equations 1 and 2 as follows:

$$\hat{f}_{t \to 0}^{2D} = -1(1-t)tf_{0 \to 1} + t^2 f_{1 \to 0} \qquad \text{Equation (1)}$$

$$\hat{f}_{t \to 1}^{2D} = 1(1-t)^2 f_{0 \to 1} - t(1-t)f_{1 \to 0} \qquad \text{Equation (2)}$$

In Equation 1 and Equation 2 above, t represents the time step of the interpolated frame $\hat{X}_{ref_t}$ (corresponding to the input frame $X_t$) between a time step of reference frame $\hat{X}_{ref_0}$ and a time step of reference frame $\hat{X}_{ref_1}$ (e.g., a time step in the interval 0 to 1), $f_{0 \to 1}$ represents an optical flow from reference frame $\hat{X}_{ref_0}$ to reference frame $\hat{X}_{ref_1}$, $f_{1 \to 0}$ represents an optical flow from reference frame $\hat{X}_{ref_1}$ to reference frame $\hat{X}_{ref_0}$, $\hat{f}_{t \to 0}^{2D}$ represents a 2D optical flow map identifying backward motion from t to the time step associated with the reference frame $\hat{X}_{ref_0}$ (e.g., time step 0 in the example shown in FIG. 7C), and $f_{t \to 1}^{2D}$ represents a 2D optical flow map identifying forward motion from t to the time step associated with the reference frame $\hat{X}_{ref_1}$ (e.g., time step 1 in the example shown in FIG. 7C).

The 2D warping layer 734 can obtain the 2D optical flow maps 744, the reference frame $\hat{X}_{ref_0}$, and the reference frame $\hat{X}_{ref_1}$, and can generate warped frames 746. The warped frames 746 can include a warped frame ($W_{x0}$) corresponding to the reference frame $\hat{X}_{ref_0}$. The 2D warping layer 734 can generate the warped frame $W_{x0}$ by applying the 2D optical flow map $f_{t \to 0}^{2D}$ to reference frame $\hat{X}_{ref_0}$. The warped frames 746 can also include a warped frame ($W_{x1}$) corresponding to the reference frame $\hat{X}_{ref_1}$. The 2D warping layer 734 can generate the warped frame $W_{x1}$ by applying the 2D optical flow map $\hat{f}_{t \to 1}^{2D}$ to reference frame $\hat{X}_{ref_1}$. The 2D warping layer 734 can implement one or more warping functions to warp the reference frame $\hat{X}_{ref_0}$ to the time step t and warp the reference frame $\hat{X}_{ref_1}$ to the time step t.

In some examples, to generate the warped frame $W_{x0}$, the 2D warping layer 734 can use the 2D optical flow map $\hat{f}_{t \to 0}^{2D}$ calculated for the reference frame $\hat{X}_{ref_0}$ to move pixels in the reference frame $\hat{X}_{ref_0}$ to respective locations corresponding to and/or relative to time t. Similarly, to generate the warped frame $W_{x1}$, the 2D warping layer 734 can use the 2D optical flow map $\hat{f}_{t \to 1}^{2D}$ calculated for the reference frame $\hat{X}_{ref_1}$ to move pixels in the reference frame $\hat{X}_{ref_1}$ to respective locations corresponding to and/or relative to time t. In some cases, the warped frames 746 can include a 2D frame for reference frame $\hat{X}_{ref_0}$ that accounts for vertical and/or horizontal displacements of pixels (and/or pixel locations) at time t, and a 2D frame for reference frame $\hat{X}_{ref_1}$ that accounts for vertical and/or horizontal displacements of pixels (and/or pixel locations) at time t.

The refinement layer 736 can obtain as input the 2D optical flow maps 744, the warped frames 746, and the reference frames $\hat{X}_{ref_0}$ and $\hat{X}_{ref_1}$, and can perform refinement operations using the input data. The refinement layer 736 can be an optional component of the frame interpolation engine 725 in some examples. In some cases, the refinement layer 736 can include one or more neural networks or other machine learning systems. In one illustrative example, the refinement layer 736 can include one or more interpolation convolutional neural networks (CNNs). In some examples, the refinement operations performed by the refinement layer 736 can include refining and/or correcting values in the 2D optical flow maps 744. For example, in some cases, some or all of the movement between time step 0 corresponding to reference frame $\hat{X}_{ref_0}$ and time step 1 corresponding to reference frame $\hat{X}_{ref_1}$ may not be linear. The refinement layer 736 can detect and correct such non-linear movement. The refinement layer 736 can generate refined 2D optical flows that account for such non-linearity. Additionally or alternatively, the refinement layer 736 can refine or correct artifacts in any of the warped frames 746 (and/or any of the reference frames $\hat{X}_{ref_0}$ and $\hat{X}_{ref_1}$), refine or correct portions of any of the warped frames 746 (and/or any of the reference frames $\hat{X}_{ref_0}$ and $\hat{X}_{ref_1}$) such as edges, make refinements or corrections to account for an occlusion(s) in any of the warped frames 746 (and/or any of the reference frames $\hat{X}_{ref_0}$ and $\hat{X}_{ref_1}$), and/or perform any other refinement of image data and/or optical flow information associated with the warped frames 746 and/or the reference frames $\hat{X}_{ref_0}$ and $\hat{X}_{ref_1}$.

In some examples, the refinement operations can also include merging the 2D optical flow maps 744 into a 3D optical flow map 748 for the interpolated frame $\hat{X}_{ref_t}$. For example, as previously noted, the 2D optical flow maps 744 can include a 2D optical flow map (e.g., $\hat{f}_{t \to 0}^{2D}$) for the reference frame $\hat{X}_{ref_0}$ and a 2D optical flow map (e.g., $\hat{f}_{t \to 1}^{2D}$) for the reference frame $\hat{X}_{ref_1}$. The refinement layer 736 can merge the 2D optical flow maps 744 (e.g., the 2D optical flow map $\hat{f}_{t \to 0}^{2D}$ and the 2D optical flow map $\hat{f}_{t \to 1}^{2D}$) to generate a 3D optical flow map 748. The 3D optical flow map 748 can map specific frames (e.g., reference frame $\hat{X}_{ref_0}$ and reference frame $\hat{X}_{ref_1}$) to corresponding optical flow information. For example, the 3D optical flow map 748 can include two spatial dimensions (e.g., X and Y axes or vertical and horizontal dimensions) and a third dimension (e.g., a frame dimension) including frame information. The frame information in the third dimension can identify the frame (e.g., reference frame $\hat{X}_{ref_0}$ or reference frame $\hat{X}_{ref_1}$) to which the motion information (e.g., vertical and/or horizontal displacements) in the two spatial dimensions applies.

For instance, if the third dimension (e.g., the frame dimension) identifies reference frame $\hat{X}_{ref_0}$, the corresponding values in the spatial dimensions (e.g., in the X and Y axes or vertical and horizontal dimensions) can indicate the horizontal and/or vertical displacements for the pixels in the reference frame $\hat{X}_{ref_0}$ (e.g., how much the pixels in reference frame $\hat{X}_{ref_0}$ should be moved based on the optical flow information in the spatial dimensions). Similarly, if the third dimension identifies reference frame $\hat{X}_{ref_1}$, the corresponding values in the spatial dimensions can indicate the horizontal and/or vertical displacements for the pixels in the reference frame $\hat{X}_{ref_1}$ (e.g., how much the pixels in reference frame $\hat{X}_{ref_1}$ should be moved based on the optical flow information in the spatial dimensions).

In some cases, the refinement layer 736 can use the 2D optical flow maps 744 to merge the 2D optical flow maps 744 into the 3D optical flow map 748. In some examples, the refinement layer 736 can use the refined 2D optical flows generated by refining the 2D optical flow maps 744 to merge the 2D optical flow maps 744 into the 3D optical flow map 748. In some cases, the refinement layer 736 can use the reference frames $\hat{X}_{ref_0}$ and $\hat{X}_{ref_1}$, the warped frames 746, and/or the 2D optical flow maps 744 (or the refined 2D optical flows) as inputs to generate the 3D optical flow map 748.

The 3D warping layer 738 can use the 3D optical flow map 748 and the reference frames $\hat{X}_{ref_0}$ and $\hat{X}_{ref_1}$ (and/or the warped frames 746) to generate the interpolated reference frame $\hat{X}_{ref_t}$ corresponding to time step t (corresponding to the time step of the input frame $X_t$). For example, the 3D warping layer 738 can use the 3D optical flow map 748 to warp the reference frames $\hat{X}_{ref_0}$ and $\hat{X}_{f_1}$ (or the warped frames 746), and fuse the warped frames (e.g., the warped reference frames $\hat{X}_{ref_0}$ and $\hat{X}_{ref_1}$ or warped frames 746) to generate the interpolated reference frame $\hat{X}_{ref_t}$. In some cases, the 3D warping layer 738 can implement one or more warping functions. In one illustrative example, the following can be used to generate the interpolated frame:

$$\hat{I}_t = \alpha_0 \odot g(I_0, F_{t \to 0}) + (1 - \alpha_0) \odot g(I_1, F_{t \to 1}), \quad \text{Equation (3)}$$

where $g(\cdot, \cdot)$ is a backward warping function (which can be implemented using bilinear interpolation in some cases), the parameter $\alpha_0$ controls the contribution of the two input images $I_0$ and $I_1$ and depends on temporal consistency and occlusion reasoning, and the term $\odot$ denotes element-wise multiplication (resulting in content-aware weighting of the input images based on the $\alpha_0$ parameter).

In some cases, the optical flow estimation layer 730, the optical flow prediction layer 732, the 2D warping layer 734, the refinement layer 736, and/or the 3D warping layer 738 can be trained and/or optimized using one or more loss functions. In some cases, the optical flow estimation layer 730, the optical flow prediction layer 732, the 2D warping layer 734, the refinement layer 736 and the 3D warping layer 738 can be trained end-to-end using one or more loss functions. In one illustrative example, the loss described above (Loss=D+βR) can be used While FIG. 7C is described with respect to using optical flow interpolation, it should be noted that optical flow interpolation is used herein as an illustrative example for explanation purposes. One of ordinary skill in the art will recognize that the frame interpolation engine 722 of FIG. 7B and/or the frame interpolation engine 725 of FIG. 7C can implement any other frame interpolation technique.

Figure 8:
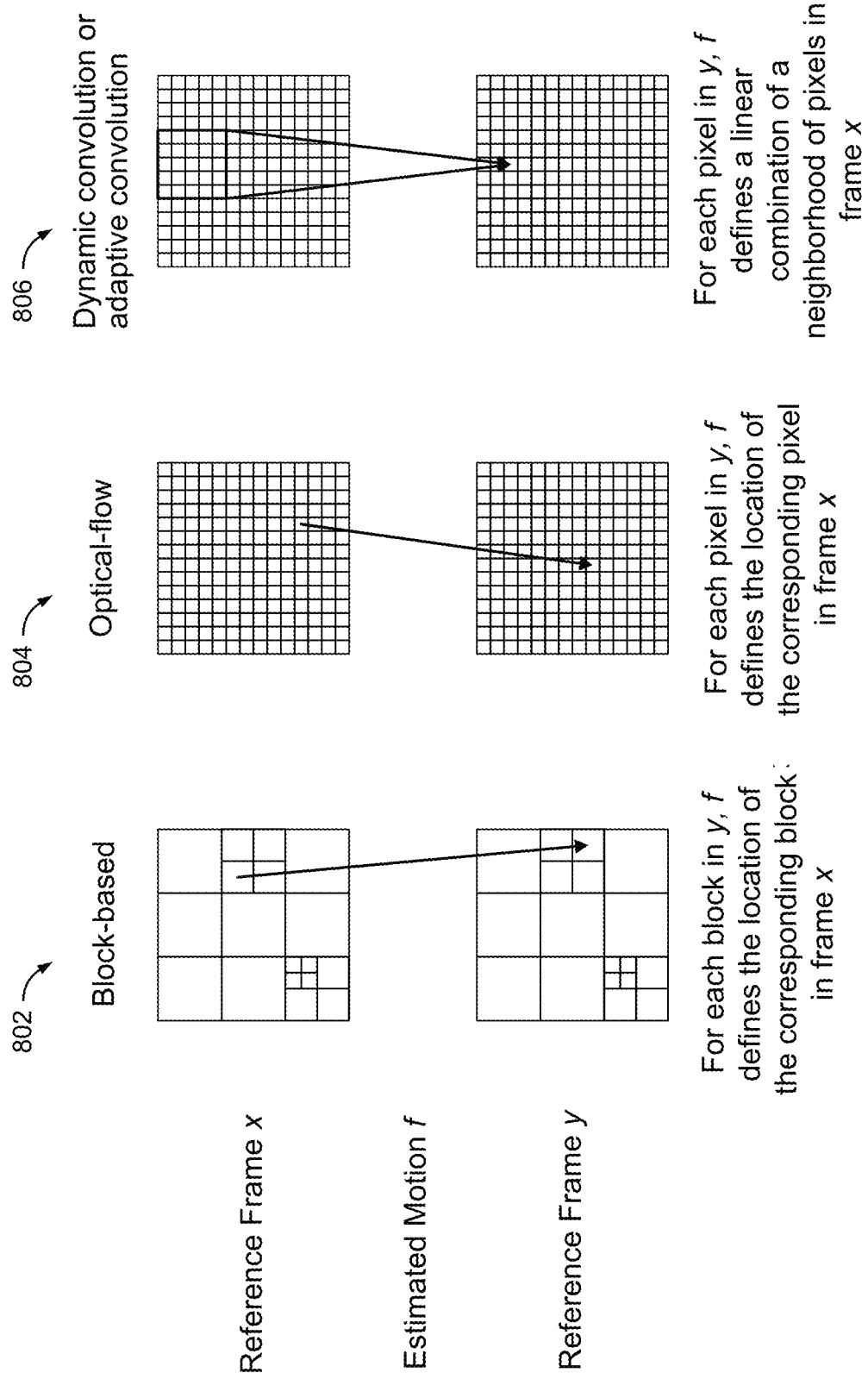
FIG. 8 is a diagram illustrating examples of motion estimation techniques, in accordance with some examples of the disclosure.

FIG. 8 is a diagram illustrating different types of motion estimations that can be performed to determine motion information between reference frames (e.g., from reference frame $\hat{X}_{ref_0}$ to reference frame $\hat{X}_{ref_1}$ or vice versa). The motion estimations in FIG. 8 can be used to determine an interpolated reference frame (e.g., as described with respect to FIG. 7B and FIG. 7C) and/or to warp a reference frame (e.g., by the warping engine 704 of FIG. 7A and FIG. 7B). In FIG. 8, the term x denotes a reference frame from which motion can be estimated, the term f denotes a motion estimation, and the term y denotes a warped frame that can be computed as follows: y=f(x).

One type of motion estimation is a block-based motion estimation technique 802. The block-based motion estimation can be performed on a block-by-block basis. For instance, for each block in the frame y, the motion estimation f defines the location of the corresponding block in the frame x. In one illustrative example, the motion estimation f can include a motion vector that indicates the displacement (e.g., the horizontal and vertical displacement) of a block in the frame y relative to the corresponding block in the frame x. A block from the frame x can be determined to correspond to a block in the frame y by determining a similarity (e.g., a similarity in pixel values) between the blocks.

Another type of motion estimation that can performed is an optical flow motion estimation technique 804. The optical flow motion estimation can be performed on a pixel-by-pixel basis. For instance, for each pixel in the frame y, the motion estimation f defines the location of the corresponding pixel in the frame x. The motion estimation f for each pixel can include a vector indicates a movement of the pixel between the frames. In some cases, optical flow maps (also referred to as motion vector maps) can be generated based on the computation of the optical flow vectors between frames. The optical flow maps can include an optical flow vector for each pixel in a frame, where each vector indicates a movement of a pixel between the frames. In one illustrative example, the optical flow vector for a pixel can be a displacement vector (e.g., indicating horizontal and vertical displacements, such as x- and y-displacements) showing the movement of a pixel from a first frame to a second frame.

In some cases, the optical flow map can include vectors for less than all pixels in a frame. For instance, a dense optical flow can be computed between frames to generate optical flow vectors for each pixel in a frame, which can be included in a dense optical flow map. In some examples, each optical flow map can include a 2D vector field, with each vector being a displacement vector showing the movement of points from a first frame to a second frame.

As noted above, an optical flow vector or optical flow map can be computed between frames of a sequence of frames. Two frames can include two directly adjacent frames that are consecutively captured frames or two frames that are a certain distance apart (e.g., within two frames of one another, within three frames of one another, or any other suitable distance) in a sequence of frames. In one illustrative example, a pixel I(x, y, t) in the frame x can move by a distance or displacement (Δx, Δy) in the frame y.

Another type of motion estimation that can be performed is a dynamic convolution (also referred to as adaptive convolution) motion estimation technique 806. The dynamic convolution motion estimation can be performed on a pixel-by-pixel basis. For instance, for each pixel in the frame y, the motion estimation f defines a linear combination of a neighborhood of pixels in the frame x. As shown in FIG. 8, for a pixel at a pixel location in the frame y, a kernel or matrix is defined around a neighborhood of pixels surrounding a pixel at a same pixel location in the frame x. The example dynamic convolution motion estimation in FIG. 8 is performed for a pixel at a location (2, 7) (corresponding to (row number, column number)) in the frame y, where the top-left pixel location in the frame y is at location (0, 0). The kernel is defined around a pixel at location (2, 7) in the frame x. For example, as shown, a kernel of size 5×5 is applied to a neighborhood of pixels surrounding the pixel at location (2, 7) in the frame x.

Each entry in the kernel or matrix can include a number (e.g., a set of 5×5 numbers in the example of FIG. 8). The set of numbers in the kernel can describe how to combine the pixels from the neighborhood of pixels that surround the pixel at the pixel location in the frame x corresponding to the same pixel location of the pixel that is being mapped and/or reconstructed in frame y.

Figure 9:
FIG. 9 is a diagram illustrating an example of an I-frame, B-Frame, I-Frame (IBI) coding technique, in accordance with some examples of the disclosure.

FIG. 9 and FIG. 10 are diagrams illustrating different examples of group of pictures (GoP) structures (corresponding to an order of frames in a GoP). FIG. 9 illustrates an example of an I-frame, B-Frame, I-Frame (IBI) coding technique. The IBI technique can be used, for example, in a RandomAccess mode in traditional coding systems (e.g., that operate according to one or more video coding standards, such as HEVC or VVC). As shown, for the first GoP (denoted as GoP1), a coding system (e.g., the coding system 600 of FIG. 6) can code (e.g., encode/compress and/or decode/decompress) the first and last frames as I-frames and can compress the middle frames as B-frames. As shown by the arrows in the row labeled "Ref", the two I-frames are used as reference frames for the B-frame compression. The row labeled "Order" indicates that the I-frames are coded first and the middle B-frame is coded next. In the second GoP (denoted as GoP2), the B-frame can be coded using a reference frame from the GoP1, so the first frame in the GoP2 does not need to be coded as an I-frame. The B-fame in GoP2 can be coded using the last frame (an I-frame) in GoP1 and using the last frame (also an I-frame) as reference frames. The B-frame coding system 600 of FIG. 6 or the B-frame coding system 720 of FIG. 7B can be used to code the B-frames. For instance, the first I-frame in the GoP1 of FIG. 9 can be the reference frame $\hat{X}_{ref_0}$ in FIG. 7B and the last I-frame in the GoP1 of FIG. 9 can be the reference frame $\hat{X}_{ref_1}$ in FIG. 7B. The B-frame in GoP1 of FIG. 9 can be the reconstructed frame $\hat{X}_t$ in FIG. 7B, in which case an interpolated frame ($\hat{X}_{ref_t}$) can be generated using the two I-frames in GoP1.

FIG. 10 is a diagram illustrating an example of an I-frame, B-Frame, P-Frame (IBP) coding technique. For example, because the B-frame coding system described herein (e.g., the B-frame coding system 720 of FIG. 7B) uses a P-frame coding system (e.g., the P-frame coding system 700 of FIG. 7A and FIG. 7B), P-frames can be generated using the same components without adding additional complexity, in the event the parameters (e.g., weights, biases, etc.) are common when the P-frame coding system is used for uni-prediction and for bi-prediction. In the example of FIG. 10, the last frame of each GoP does not have to be an I-frame (as was the case in the IBI GoP structure of FIG. 9), and instead can be coded as a P-frame. The coding order in FIG. 10 is also different as compared to that of FIG. 9. For example, the first frame of the GoP1 in FIG. 1 is coded (e.g., encode/compress and/or decode/decompress) first as an I-frame. Using the I-frame as a reference frame, the last frame in the GoP1 can be coded as a P-frame (e.g., by the P-frame coding system 700 of FIG. 7A). The I-frame and the P-frame in GoP1 can then be used to code the middle frame as a B-frame (e.g., using the B-frame coding system 600 of FIG. 6 or the B-frame coding system 720 of FIG. 7B). For the GoP2, the last frame of the GoP1 can be used (e.g., by the P-frame coding system 700 of FIG. 7A) as a reference frame for coding of the last frame of the GoP2 as a P-frame. The last frame of the GoP1 and the last frame of the GoP2 can be used (e.g., by the B-frame coding system 600 of FIG. 6 or the B-frame coding system 720 of FIG. 7B) as reference frames for coding of the middle frame of the GoP2 as a B-frame.

Figure 11:
FIG. 11 is a diagram illustrating an example sequential scheme for bidirectional frame prediction, in accordance with some examples of the disclosure.
Figure 12:
FIG. 12 is a diagram illustrating an example hierarchical scheme for bidirectional frame prediction, in accordance with some examples of the disclosure.

FIG. 11 and FIG. 12 are diagrams illustrating frame coding order within a GoP. For instance, once the coding system (e.g., an I-frame coding system and/or P-frame coding system) determines the two reference frames for a GoP (e.g., the first and last frames in the GoP of FIG. 11 and FIG. 12), the B-frame coding system (e.g., by the B-frame coding system 600 of FIG. 6 or the B-frame coding system 720 of FIG. 7B) can begin coding the middle frames of the GoP as B-frames. The example coding orders of FIG. 11 and FIG. 12 define examples of the order in which those B-frames are coded (e.g., encode/compress and/or decode/decompress). In one illustrative example, the first frame and the last frame of the GoPs of FIG. 11 and FIG. 12 can include I-frames, similar to that shown in FIG. 9. In another illustrative example, the first frame of the GoPs of FIG. 11 and FIG. 12 can include an I-frame and the last frame can include a P-frame, similar to that shown in FIG. 10.

FIG. 11 illustrates an example of a sequential scheme for bi-prediction. In the sequential scheme of FIG. 11, the B-frames are coded sequentially from left to right (e.g., by the B-frame coding system 600 of FIG. 6 or the B-frame coding system 720 of FIG. 7B). As shown, the B-frame with order number 2 is coded first using bi-prediction with the first and last frames of the GoP used as reference frames. The B-frame with order number 3 is coded next using bi-prediction with the previous B-frame (with order number 2) and the last frame of the GoP used as reference frames. The B-frame with order number 4 is coded after the B-frame with order number 3, followed by the B-frame with order number 5, and so on.

FIG. 12 illustrates an example of a hierarchical scheme for bidirectional frame prediction. In the hierarchical scheme of FIG. 12, once the two initial reference frames (the first and last frames of the GoP) are available, the coding system (e.g., the B-frame coding system 600 of FIG. 6 or the B-frame coding system 720 of FIG. 7B) can code the fifth frame (the middle frame with order number 2) as the first B-frame using the two initial reference frames in bi-prediction. The coding system can then code either the third frame or the seventh frame (both with order number 3) in the GoP using the reference frames indicated by the "Ref" row in FIG. 12. For instance, the third frame (with order number 3) can be coded using the first frame of the GoP (which can be an I-frame) and the fifth frame of the GoP (which is a B-frame) as reference frames, and the seventh frame (with order number 3) can be coded using the last frame of the GoP (which can be an I-frame or a P-frame) and the fifth frame of the GoP (a B-frame) as reference frames. The frames labeled with order number 4 can then be coded in any order using the reference frames indicated by the "Ref" row in FIG. 12.

Figures 13A, 13B:
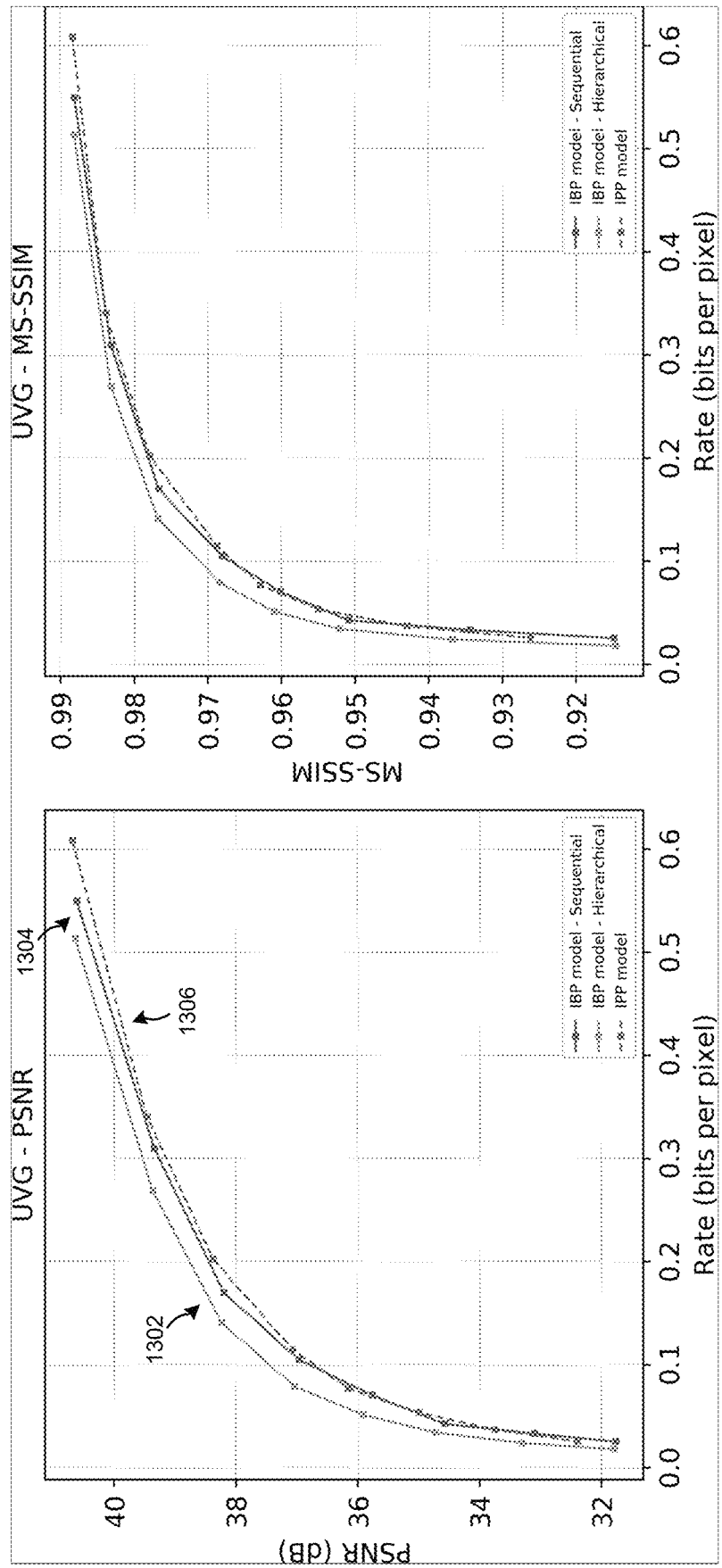
FIG. 13A and FIG. 13B are graphs illustrating performance results of the B-frame coding system described herein, in accordance with some examples of the disclosure.

FIG. 13A and FIG. 13B are graphs illustrating performance of the B-frame coding system 600 of FIG. 6 (e.g., implemented using the B-frame coding system 720 of FIG. 7B) relative to a baseline coding system that does not use interpolated reference frames. All three coding systems illustrated in the graphs of FIG. 13A and FIG. 13B are neural network based coding systems that were trained using the same training conditions (e.g., using the same training data set, the same loss functions, and the same number of training iterations, etc.). The graphs represent the performance by plotting rate (represented as bits per pixel) as a function of the Peak signal-to-noise ratio (PSNR). The line 1302 illustrates the performance of the B-frame coding system 720 of FIG. 7B when the hierarchical coding order of FIG. 12 is used. The line 1304 illustrates the performance of the B-frame coding system 720 when the sequential coding order of FIG. 11 is used. The line 1306 illustrates the performance of the baseline coding system. The top-left corner of the graphs (lower rate with higher PSNR) indicate better performance. As shown in both FIG. 13A and FIG. 13B, the line 1302 (the B-frame coding system 720 using hierarchical coding) indicates the highest performance, followed by the line 1304 (the B-frame coding system 720 using sequential coding), which followed by the line 1306 (the baseline coding system).

FIG. 14A to FIG. 14F are graphs illustrating performance of the B-frame coding system 600 of FIG. 6 (e.g., implemented using the B-frame coding system 720 of FIG. 7B) in terms of rate per frame (as shown by the graphs labeled Rate vs. Frame Index), PSNR per frame (as shown by the graphs labeled PSNR vs. Frame Index), and Multi-scale Structural Similarity (MS-SSIM) per frame (as shown by the graphs labeled MS-SSIM vs. Frame Index). The x-axes of the graphs include the frame index representing the frame order, and the y-axes include the various performance metrics (e.g., rate, PSNR, and MS-SSIM). The number of frames in each GoP is twelve in the examples of FIG. 14A to FIG. 14F, and the graphs illustrate the average of all the GoPs in the video sequence used to generate the results.

Figure 14E:
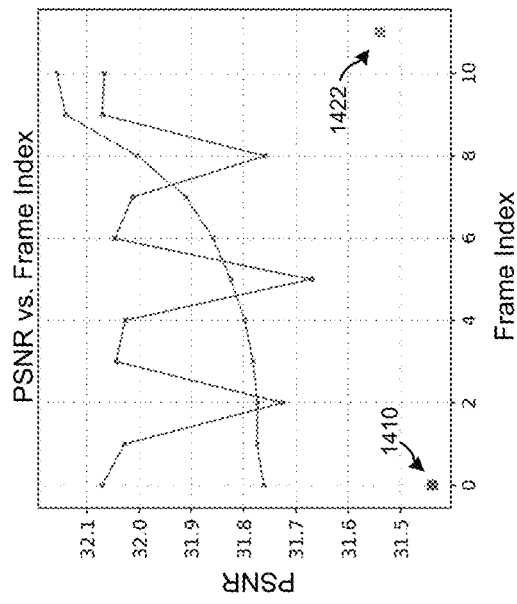
Figure 14D:
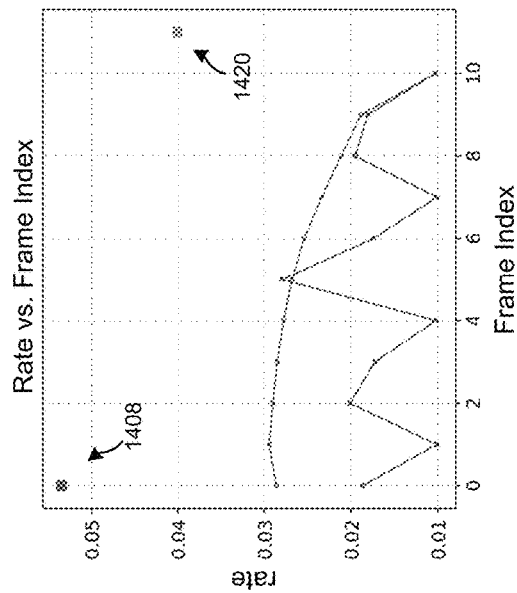
Figure 14F:
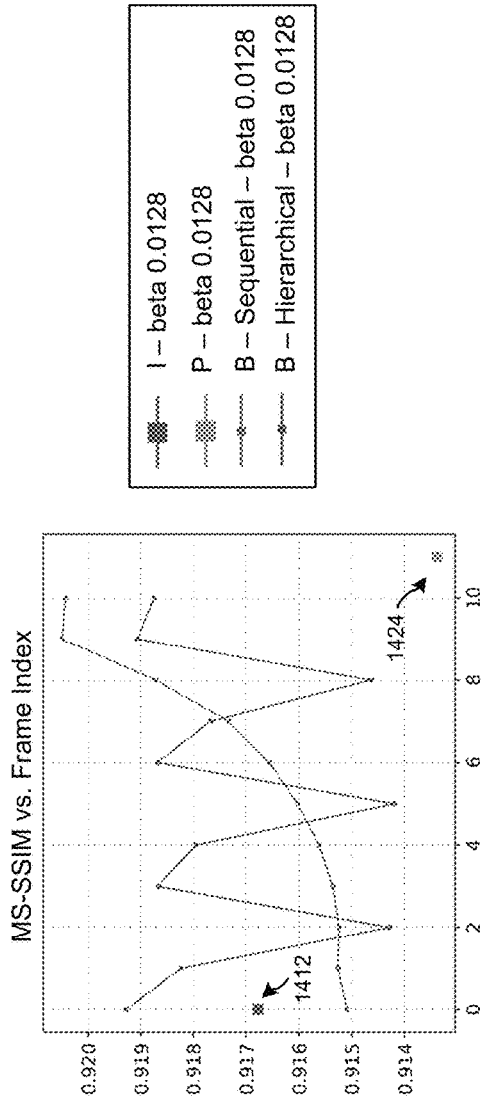

The first frame in each GoP sequence (with frame index 0) is generated as an I-frame using intra-prediction (e.g., as indicated by the GoP structures of FIG. 9 and FIG. 10). The dot 1402 in FIG. 14A, the dot 1404 in FIG. 14B, the dot 1406 in FIG. 14C, the dot 1408 in FIG. 14D, the dot 1410 in FIG. 14E, and the dot 1412 in FIG. 14E represent the metric (rate, PSNR, or MS-SSIM) of the I-frame. For instance, the dot 1402 in FIG. 14A shows the rate (number of bits) used for compression of that I-frame. The last frame in each GoP sequence (with frame index 11) is generated as a P-frame using uni-prediction (e.g., by the P-frame coding system 700 of FIG. 7A). The dot 1414 in FIG. 14A, the dot 1416 in FIG. 14B, the dot 1418 in FIG. 14C, the dot 1420 in FIG. 14D, the dot 1422 in FIG. 14E, and the dot 1424 in FIG. 14E represent the metric (rate, PSNR, or MS-SSIM) of the P-frame. For instance, as illustrated in FIG. 14A, less bits are used for the P-frame than that used for the I-frame.

The frames between the first frame and the last frame are coded as B-frames (e.g., by the B-frame coding system 720 of FIG. 7B). Two sets of results are shown for the B-frames, one using the sequential coding order of FIG. 11 and the other using the hierarchical coding order of FIG. 12. Referring to FIG. 14A as an example, the line 1426 represents the results using the sequential coding order, where the frame with frame index of 1 is coded first as a B-frame, followed by the frame with frame index of 2, and so on. The line 1428 in FIG. 15A represents the results using the hierarchical coding order, where the frame with frame index of 5 is coded first as a B-frame, followed by the frame with frame index of 2, followed by the frame with frame index of 8, and so on. As shown in FIG. 14A, less bits are used for later-coded B-frames based on the distance of the reference frames to the B-frame being smaller for the later-coded B-frames, as shown in FIG. 12. For example, the frame with frame index of 5 is bi-predicted using the I-frame (the first frame of the GoP) and the P-frame (the last frame of the GoP) as reference frames, while the frame with frame index of 1 is bi-predicted using the I-frame and the B-frame with frame index of 2 as reference frames. The smooth lines in FIGS. 14B-F represent the respective results using the hierarchical coding order of FIG. 12, and the jagged lines in FIGS. 14B-F represent the respective results using the sequential coding order of FIG. 11.

Figure 15:
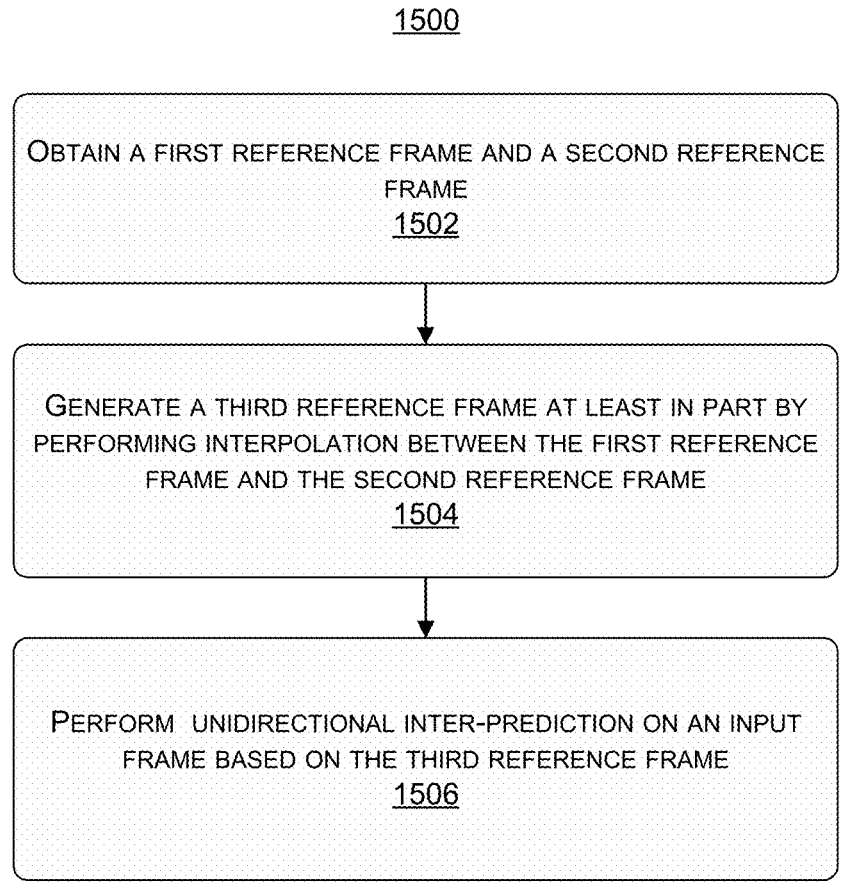
FIG. 15 is a flowchart illustrating an example of a process for processing video data, in accordance with some examples of the disclosure.

FIG. 15 is a flowchart illustrating an example of a process 1500 for performing bidirectional prediction of frames using techniques described herein. At block 1502, the process 1500 includes obtaining a first reference frame and a second reference frame. In one illustrative example, the first reference frame can include reference frame 0 ($Ref_0$) of FIG. 6 and the second reference frame can include reference frame 1 ($Ref_1$) of FIG. 6. In another illustrative example, the first reference frame can include reference frame 0 ($\hat{X}_{ref_0}$) of FIG. 7B and/or FIG. 7C and the second reference frame can include reference frame 1 ($\hat{X}_{ref_1}$) of FIG. 7B and/or FIG. 7C.

At block 1504, the process 1500 includes generating a third reference frame at least in part by performing interpolation between the first reference frame and the second reference frame. For instance, the process 1500 can include determining a first set of motion information representing pixel motion from the first reference frame to the third reference frame. The process 1500 can further include determining a second set of motion information representing pixel motion from the second reference frame to the third reference frame. In some aspects, the first set of motion information and the second set of motion information are determined based on pixel motion between the first reference frame and the second reference frame. In some cases, the first set of motion information includes a first optical flow map and the second set of motion information includes a second optical flow map. Referring to the description of FIG. 7C as one illustrative example, the first motion information can include $\hat{f}_{t \to 0}^{2D}$ defined above using Equation (1) and the second motion information can include $f_{t \to 1}^{2D}$ defined above using Equation (2). The process 1500 can include generating first warping information at least in part by performing a warping function on the first reference frame using the first set of motion information. In some aspects, the warping function includes a bilinear interpolation function, such as that as described above with respect to FIG. 7C. The process 1500 can further include generating second warping information at least in part by performing the warping function on the second reference frame using the second set of motion information. The process 1500 can include generating the third reference frame based on the first warping information and the second warping information.

At block 1506, the process 1500 includes performing unidirectional inter-prediction on an input frame based on the third reference frame. For instance, to perform the unidirectional inter-prediction, the process 1500 can include estimating motion between the input frame and the third reference frame. In one illustrative example, the predicted motion can include the predicted motion $\hat{f}_t$ of FIG. 7B. In some cases, the estimated motion between the input frame and the third reference frame includes optical flow data (e.g., determined using the optical flow motion estimation technique 804 shown in FIG. 8). In some aspects, the estimated motion between the input frame and the third reference frame includes dynamic convolution data (e.g., determined using the dynamic convolution motion estimation technique 806 shown in FIG. 8). In some aspects, the estimated motion between the input frame and the third reference frame includes block-based motion data (e.g., determined using the block-based motion estimation technique 802 shown in FIG. 8). The process 1500 can further include generating a warped frame at least in part by warping one or more pixels of the third reference frame based on the estimated motion. For instance, referring to FIG. 7B as an illustrative example, the warping engine 704 can warp pixels of the interpolated reference frame $\hat{X}_{ref\_t}$ based on motion vectors (or other motion data) included in the predicted motion $\hat{f}_t$.

In some examples, to further perform the unidirectional inter-prediction, the process 1500 can include determining a residual at least in part by determining a difference between the input frame and the warped frame. The process 1500 can further include generating a predicted residual using the residual. Referring to FIG. 7B as an illustrative example, the P-frame coding system 700 can generate the residual $r_t$ as the difference between the frame t prediction $\hat{X}_t$ and the input frame $X_t$. The residual prediction system 706 can generate the predicted residual $\hat{r}_t$ using the techniques described above.

In some aspects, the motion is estimated using a first neural network (e.g., a first autoencoder or other type of neural network), and the predicted residual is generated using a second neural network (e.g., a second autoencoder or other type of neural network). In one illustrative example, the first neural network can include the motion prediction system 702 of FIG. 7B, and the second neural network can include the residual prediction system 706 of FIG. 7B. In some examples, the process 1500 can include generating, based on the warped frame and the predicted residual, a reconstructed frame representing the input frame. The reconstructed frame includes a bidirectionally-predicted frame. Again referring to FIG. 7B as an illustrative example, the P-frame coding system 720 can generate the reconstructed frame t ($\tilde{X}_t$) by adding the frame t prediction $\hat{X}_t$ (generated by warping the interpolated reference frame $\hat{X}_{ref\_t}$) to the predicted residual $\hat{r}_t$. In some cases, the process 1500 can further include causing the reconstructed frame to be stored in a memory (e.g., a decoded picture buffer (DPB) or other memory). In some examples, the stored reconstructed frame can be used for inter-prediction of other frames.

As described above, the P-frame coding system described herein (e.g., the P-frame coding system 700 of FIG. 7A) can perform bi-prediction using an interpolated reference frame (e.g., interpolated reference frame $\hat{X}_{ref\_t}$) and can also perform uni-prediction. For instance, to perform uni-prediction, the process 1500 can include obtaining a fourth reference frame (e.g., reference frame $\hat{X}_{ref}$). The process 1500 can further include estimating motion (e.g., using the motion prediction system 702) between an additional input frame and the fourth reference frame. In one illustrative example, the estimated motion can include the predicted motion $\hat{f}_t$ illustrated in FIG. 7A. The process 1500 can include generating an additional warped frame (e.g., using the warping engine 704) at least in part by warping one or more pixels of the fourth reference frame based on the estimated motion. Again referring to FIG. 7A as an illustrative example, the additional warped frame can include the frame prediction $\tilde{X}_r$. The process 1500 can include generating, based on the additional warped frame and an additional predicted residual, a reconstructed frame representing the additional input frame, in which case the reconstructed frame representing the additional input frame includes a unidirectionally-predicted frame. Referring to FIG. 7A as an illustrative example, the P-frame coding system 720 can generate the reconstructed frame t ($\hat{X}_t$) by adding the frame t prediction $\tilde{X}_t$ (generated by warping the reference frame $\tilde{X}_{ref}$) to the predicted residual $\hat{r}_t$. In some cases, the process 1500 can include causing the reconstructed frame representing the additional input frame to be stored in a memory (e.g., a decoded picture buffer (DPB) or other memory). In some examples, the stored reconstructed frame representing the additional input frame can be used for inter-prediction of other frames.

FIG. 16 is a flowchart illustrating another example of a process 1600 for performing bidirectional prediction of frames using techniques described herein. In some cases, at least part of the process 1600 can be performed by the decoder network 703 of the motion prediction system 702 and by the decoder network 709 of the residual prediction system 706. At block 1602, the process 1600 includes obtaining an interpolated reference frame and motion information representing motion between an input frame and the interpolated reference frame. In one illustrative example, the interpolated reference frame can include the interpolated reference frame $\hat{X}_{ref\_t}$ of FIG. 7B. In some aspects, the motion information is obtained from a bitstream. For instance, the motion information can include the latent $z_m$ shown in FIG. 7B. At block 1604, the process 1600 includes estimating, based on the motion information, the motion between the input frame and the interpolated reference frame. For instance, the decoder network 703 of the motion prediction system 702 can estimate the motion between the input frame $X_t$ and the interpolated reference frame $\hat{X}_{ref\_t}$ based on the latent $z_m$. The estimated motion can include the predicted motion $\hat{f}_t$ of FIG. 7B.

At block 1606, the process 1600 includes generating a warped frame at least in part by warping one or more pixels of the interpolated reference frame based on the estimated motion. For instance, referring to FIG. 7B as an illustrative example, the warping engine 704 can warp pixels of the interpolated reference frame $\hat{X}_{ref\_t}$ based on motion vectors (or other motion data) included in the predicted motion $\hat{f}_t$.

At block 1608, the process 1600 includes generating, based on the warped frame and a predicted residual, a reconstructed frame representing the input frame. The reconstructed frame includes a bidirectionally-predicted frame. Again referring to FIG. 7B as an illustrative example, the P-frame coding system 720 can generate the reconstructed frame t ($\hat{X}_t$) by adding the frame t prediction $\tilde{X}_t$ (generated by warping the interpolated reference frame $\hat{X}_{ref\_t}$) to the predicted residual $\hat{r}_t$. In some cases, the process 1500 can further include causing the reconstructed frame to be stored in a memory (e.g., a decoded picture buffer (DPB) or other memory). In some examples, the stored reconstructed frame can be used for inter-prediction of other frames.

In some examples, the process 1600 can include obtaining a first reference frame and a second reference frame. The process 1600 can further include generating the interpolated reference frame at least in part by performing interpolation between the first reference frame and the second reference frame. The techniques described herein (e.g., described with respect to FIG. 7C and/or FIG. 15) can be used to generate the interpolated reference frame.

In some examples, the process 1600 can include obtaining a residual from a bitstream. For instance, the decoder network 709 of the residual prediction system 706 can obtain the latent $z_r$ from the bitstream. The latent $z_r$ represents the residual $r_t$. The process 1600 can further include generating the predicted residual based on the obtained residual. For instance, referring to FIG. 7B as an illustrative example, the decoder network 709 can generate the predicted residual $\hat{r}_t$ using the latent $z_r$ as input.

In some aspects, similar to that described above with respect to the process 1500, the process 1600 can include obtaining a fourth reference frame, estimating motion between an additional input frame and the fourth reference frame, and generating an additional warped frame at least in part by warping one or more pixels of the fourth reference frame based on the estimated motion. The process 1600 can include generating, based on the additional warped frame and an additional predicted residual, a reconstructed frame representing the additional input frame, the reconstructed frame representing the additional input frame including a unidirectionally-predicted frame.

In some examples, the process 1500 and/or the process 1600 can include training, for one or more training iterations, the neural network system using a loss function (e.g., Loss). In some cases, the loss function can determine a loss between one or more reconstructed B-frames and one or more frames represented by the one or more reconstructed B-frames. In some examples, the first loss function can equal $D+\beta R$, as previously described.

Figure 17:
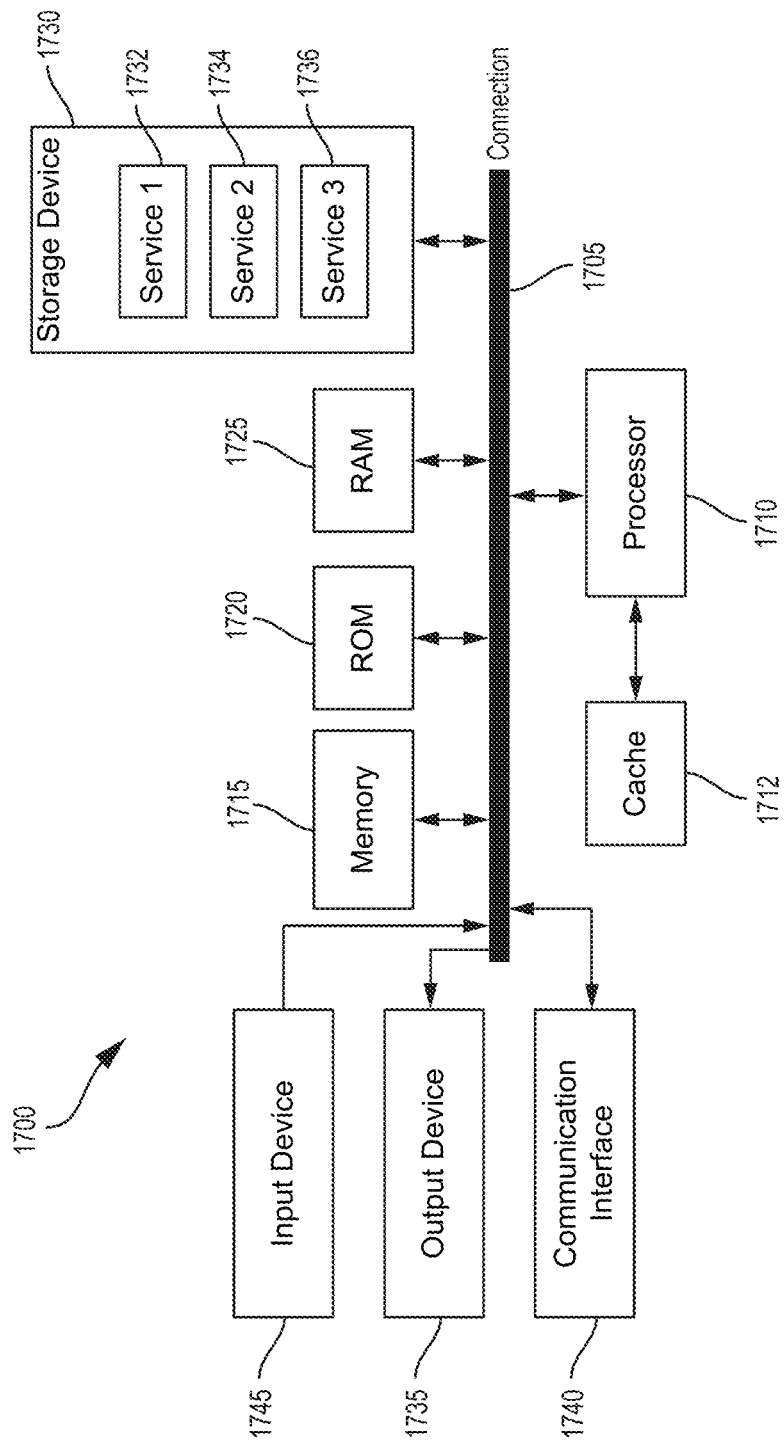
FIG. 17 illustrates an example computing system that can be used to implement various aspects described herein.

In some examples, the processes described herein (e.g., process 1500, process 1600, and/or other process described herein) may be performed by a computing device or apparatus, such as a computing device having the computing device architecture 1700 shown in FIG. 17. The computing device can include any suitable device, such as an autonomous vehicle computer, a robotic device, a mobile device (e.g., a mobile phone), a desktop computing device, a tablet computing device, a wearable device, a server device, a video game device, an extended reality device (e.g., a virtual reality (VR) device, an augmented reality (AR) device, or a mixed reality (MR) device), a camera device, a set-top box device, and/or any other computing device with the resource capabilities to perform the processes described herein, including process 800. In some examples, the computing device can include a mobile device, a wearable device, an XR device, a personal computer, a laptop computer, a video server, a television, a camera, a set-top box, a video game console, or other device. In some examples, the process 1500 and/or the process 1600 can be performed by a computing device with the computing device architecture 1700 implementing the B-frame coding system 600 of FIG. 6 and/or the B-frame coding system 720 of FIG. 7B.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), application-specific integrated circuits (ASICs), field-programmable gate arrays (FPGAs), and/or other suitable electronic circuits), and/or can include and/or be implemented using computer software, firmware, or any combination thereof, to perform the various operations described herein.

The process 1500 and the process 1600 are illustrated as logical flow diagrams, the operations of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 1500 and process 1600) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 17 illustrates an example computing device architecture 1700 of an example computing device which can implement the various techniques described herein. In some examples, the computing device can include a mobile device, a wearable device, an XR device, a personal computer, a laptop computer, a video server, a video game console, a robotic device, a set-top box, a television, a camera, a server, or other device. For example, the computing device architecture 1700 can implement the B-frame coding system 600 of FIG. 6, the P-frame coding system 700 of FIG. 7A, and/or the B-frame coding system 720 of FIG. 7B. The components of computing device architecture 1700 are shown in electrical communication with each other using connection 1705, such as a bus. The example computing device architecture 1700 includes a processing unit (CPU or processor) 1710 and computing device connection 1705 that couples various computing device components including computing device memory 1715, such as read only memory (ROM) 1720 and random access memory (RAM) 1725, to processor 1710.

Computing device architecture 1700 can include a cache of high-speed memory connected directly with, in close proximity to, or integrated as part of processor 1710. Computing device architecture 1700 can copy data from memory 1715 and/or the storage device 1730 to cache 1712 for quick access by processor 1710. In this way, the cache can provide a performance boost that avoids processor 1710 delays while waiting for data. These and other modules can control or be configured to control processor 1710 to perform various actions. Other computing device memory 1715 may be available for use as well. Memory 1715 can include multiple different types of memory with different performance characteristics. Processor 1710 can include any general purpose processor and a hardware or software service, such as service 1 1732, service 2 1734, and service 3 1736 stored in storage device 1730, configured to control processor 1710 as well as a special-purpose processor where software instructions are incorporated into the processor design. Processor 1710 may be a self-contained system, containing multiple cores or processors, a bus, memory controller, cache, etc. A multi-core processor may be symmetric or asymmetric.

To enable user interaction with the computing device architecture 1700, input device 1745 can represent any number of input mechanisms, such as a microphone for speech, a touch-sensitive screen for gesture or graphical input, keyboard, mouse, motion input, speech and so forth. Output device 1735 can also be one or more of a number of output mechanisms known to those of skill in the art, such as a display, projector, television, speaker device, etc. In some instances, multimodal computing devices can enable a user to provide multiple types of input to communicate with computing device architecture 1700. Communication interface 1740 can generally govern and manage the user input and computing device output. There is no restriction on operating on any particular hardware arrangement and therefore the basic features here may easily be substituted for improved hardware or firmware arrangements as they are developed.

Storage device 1730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1725, read only memory (ROM) 1720, and hybrids thereof. Storage device 1730 can include services 1732, 1734, 1736 for controlling processor 1710. Other hardware or software modules are contemplated. Storage device 1730 can be connected to the computing device connection 1705. In one aspect, a hardware module that performs a particular function can include the software component stored in a computer-readable medium in connection with the necessary hardware components, such as processor 1710, connection 1705, output device 1735, and so forth, to carry out the function.

The term "device" is not limited to one or a specific number of physical objects (such as one smartphone, one controller, one processing system, and so on). As used herein, a device can include any electronic device with one or more parts that may implement at least some portions of this disclosure. While the description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the description and examples use the term "system" to describe various aspects of this disclosure, the term "system" is not limited to a specific configuration, type, or number of objects.

Specific details are provided in the description to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A system for processing video data, the system comprising: a bidirectional coding engine including an interpolation engine and a unidirectional coding engine, wherein: the interpolation engine is configured to: obtain a first reference frame and a second reference frame; and generate a third reference frame at least in part by performing interpolation between the first reference frame and the second reference frame; and the unidirectional coding engine is configured to: perform unidirectional inter-prediction on an input frame based on the third reference frame.

Aspect 2: The system of aspect 1, wherein the unidirectional coding engine includes a motion engine and a warping engine, and wherein: the motion engine is configured to estimate motion between the input frame and the third reference frame; and the warping engine is configured to generate a warped frame at least in part by warping one or more pixels of the third reference frame based on the estimated motion.

Aspect 3: The system of aspect 2, wherein the unidirectional coding engine further includes a residual engine, and wherein: the residual engine is configured to: determine a residual at least in part by determining a difference between the input frame and the warped frame; and generate a predicted residual using the residual.

Aspect 4: The system of aspect 3, further comprising a memory and at least one processor coupled to the memory, wherein the unidirectional coding engine is configured to generate, based on the warped frame and the predicted residual, a reconstructed frame representing the input frame, the reconstructed frame including a bidirectionally-predicted frame; and wherein the at least one processor is configured to cause the reconstructed frame to be stored in the memory.

Aspect 5: The system of aspect 4, wherein the at least one processor includes a neural processing unit (NPU).

Aspect 6: The system of any of aspects 3 to 5, wherein the motion engine includes a first neural network and the residual engine includes a second neural network.

Aspect 7: The system of aspect 6, wherein the first neural network includes a first autoencoder and the second neural network includes a second autoencoder.

Aspect 8: The system of any of aspects 1 to 7, wherein the unidirectional coding engine is configured to: obtain a fourth reference frame; estimate motion between an additional input frame and the fourth reference frame; generate an additional warped frame at least in part by warping one or more pixels of the fourth reference frame based on the estimated motion; and generate, based on the additional warped frame and an additional predicted residual, a reconstructed frame representing the additional input frame, the reconstructed frame representing the additional input frame including a unidirectionally-predicted frame.

Aspect 9: The system of any of aspects 1 to 8, wherein, to generate the third reference frame at least in part by performing interpolation between the first reference frame and the second reference frame, the interpolation engine is configured to: determine a first set of motion information representing pixel motion from the first reference frame to the third reference frame; determine a second set of motion information representing pixel motion from the second reference frame to the third reference frame; generate first warping information at least in part by performing a warping function on the first reference frame using the first set of motion information; generate second warping information at least in part by performing the warping function on the second reference frame using the second set of motion information; and generate the third reference frame based on the first warping information and the second warping information.

Aspect 10: The system of aspect 9, wherein the first set of motion information and the second set of motion information are determined based on pixel motion between the first reference frame and the second reference frame.

Aspect 11: The system of any of aspects 9 or 10, wherein the first set of motion information includes a first optical flow map and the second set of motion information includes a second optical flow map.

Aspect 12: The system of any of aspects 9 to 11, wherein the warping function includes a bilinear interpolation function.

Aspect 13: The system of any of aspects 2 to 12, wherein the estimated motion between the input frame and the third reference frame includes optical flow data.

Aspect 14: The system of any of aspects 2 to 12, wherein the estimated motion between the input frame and the third reference frame includes dynamic convolution data.

Aspect 15: The system of any of aspects 2 to 12, wherein the estimated motion between the input frame and the third reference frame includes block-based motion data.

Aspect 16: The system of any of aspects 1 to 15, wherein the system is one of a mobile device, an extended reality device, or a television.

Aspect 17: The system of any of aspects 1 to 16, further comprising at least one of a display and a camera configured to capture one or more video frames.

Aspect 18: A method for processing video data, the method comprising: obtaining a first reference frame and a second reference frame; generating a third reference frame at least in part by performing interpolation between the first reference frame and the second reference frame; and performing unidirectional inter-prediction on an input frame based on the third reference frame.

Aspect 19: The method of aspect 18, further comprising: estimating motion between the input frame and the third reference frame; and generating a warped frame at least in part by warping one or more pixels of the third reference frame based on the estimated motion.

Aspect 20: The method of aspect 19, further comprising: determining a residual at least in part by determining a difference between the input frame and the warped frame; and generating a predicted residual using the residual.

Aspect 21: The method of aspect 20, further comprising: generating, based on the warped frame and the predicted residual, a reconstructed frame representing the input frame, the reconstructed frame including a bidirectionally-predicted frame; and causing the reconstructed frame to be stored in a memory.

Aspect 22: The method of any of aspects 20 or 21, wherein the motion is estimated using a first autoencoder, and wherein the predicted residual is generated using a second autoencoder.

Aspect 23: The method of any of aspects 18 to 22, further comprising: obtaining a fourth reference frame; estimating motion between an additional input frame and the fourth reference frame; generating an additional warped frame at least in part by warping one or more pixels of the fourth reference frame based on the estimated motion; and generating, based on the additional warped frame and an additional predicted residual, a reconstructed frame representing the additional input frame, the reconstructed frame representing the additional input frame including a unidirectionally-predicted frame.

Aspect 24: The method of any of aspects 18 to 23, further comprising: determining a first set of motion information representing pixel motion from the first reference frame to the third reference frame; determining a second set of motion information representing pixel motion from the second reference frame to the third reference frame; generating first warping information at least in part by performing a warping function on the first reference frame using the first set of motion information; generating second warping information at least in part by performing the warping function on the second reference frame using the second set of motion information; and generating the third reference frame based on the first warping information and the second warping information.

Aspect 25: The method of aspect 24, wherein the first set of motion information and the second set of motion information are determined based on pixel motion between the first reference frame and the second reference frame.

Aspect 26: The method of any of aspects 24 or 25, wherein the first set of motion information includes a first optical flow map and the second set of motion information includes a second optical flow map.

Aspect 27: The method of any of aspects 24 to 26, wherein the warping function includes a bilinear interpolation function.

Aspect 28: The method of any of aspects 19 to 27, wherein the estimated motion between the input frame and the third reference frame includes optical flow data.

Aspect 29: The method of any of aspects 19 to 27, wherein the estimated motion between the input frame and the third reference frame includes dynamic convolution data.

Aspect 30: The method of any of aspects 19 to 27, wherein the estimated motion between the input frame and the third reference frame includes block-based motion data.

Aspect 31: A non-transitory computer-readable medium having stored thereon instructions which, when executed by one or more processors, cause the one or more processors to: obtain a first reference frame and a second reference frame; generate a third reference frame at least in part by performing interpolation between the first reference frame and the second reference frame; and perform unidirectional inter-prediction on an input frame based on the third reference frame.

Aspect 32: The non-transitory computer-readable medium of aspect 31, further comprising instructions which, when executed by the one or more processors, cause the one or more processors to perform operations according to any of aspects 19 to 30.

Aspect 33: An apparatus for processing video data, comprising: means for obtaining a first reference frame and a second reference frame; means for generating a third reference frame at least in part by performing interpolation between the first reference frame and the second reference frame; and means for performing unidirectional inter-prediction on an input frame based on the third reference frame.

Aspect 34: The apparatus of aspect 33, further comprising means for performing operations according to any of aspects 19 to 30.

Aspect 35: A system for processing video data, the system comprising: a memory; and at least one processor coupled to the memory, the at least one processor configured to: obtain an interpolated reference frame and motion information representing motion between an input frame and the interpolated reference frame; estimate, based on the motion information, the motion between the input frame and the interpolated reference frame; generate a warped frame at least in part by warping one or more pixels of the interpolated reference frame based on the estimated motion; and generate, based on the warped frame and a predicted residual, a reconstructed frame representing the input frame, the reconstructed frame including a bidirectionally-predicted frame.

Aspect 36: The system of aspect 35, wherein the at least one processor is configured to: obtain a first reference frame and a second reference frame; and generate the interpolated reference frame at least in part by performing interpolation between the first reference frame and the second reference frame.

Aspect 37: The system of aspect 35, wherein the at least one processor is configured to: obtain a residual from a bitstream; and generate the predicted residual based on the obtained residual.

Aspect 38: The system of aspect 37, wherein the motion information is obtained from the bitstream.

Aspect 39: The system of aspect 35, wherein the at least one processor is configured to: obtain a fourth reference frame; estimate motion between an additional input frame and the fourth reference frame; generate an additional warped frame at least in part by warping one or more pixels of the fourth reference frame based on the estimated motion; and generate, based on the additional warped frame and an additional predicted residual, a reconstructed frame representing the additional input frame, the reconstructed frame representing the additional input frame including a unidirectionally-predicted frame.

Aspect 40: A method for processing video data, the method comprising: obtaining an interpolated reference frame and motion information representing motion between an input frame and the interpolated reference frame; estimating, based on the motion information, the motion between the input frame and the interpolated reference frame; generating a warped frame at least in part by warping one or more pixels of the interpolated reference frame based on the estimated motion; and generating, based on the warped frame and a predicted residual, a reconstructed frame representing the input frame, the reconstructed frame including a bidirectionally-predicted frame.

Aspect 41: The method of aspect 40, further comprising: obtaining a first reference frame and a second reference frame; and generating the interpolated reference frame at least in part by performing interpolation between the first reference frame and the second reference frame.

Aspect 42: The method of aspect 40, further comprising: obtaining a residual from a bitstream; and generating the predicted residual based on the obtained residual.

Aspect 43: The method of aspect 42, wherein the motion information is obtained from the bitstream.

Aspect 44: The method of aspect 40, further comprising: obtaining a fourth reference frame; estimating motion between an additional input frame and the fourth reference frame; generating an additional warped frame at least in part by warping one or more pixels of the fourth reference frame based on the estimated motion; and generating, based on the additional warped frame and an additional predicted residual, a reconstructed frame representing the additional input frame, the reconstructed frame representing the additional input frame including a unidirectionally-predicted frame.

Aspect 45: A non-transitory computer-readable medium having stored thereon instructions which, when executed by one or more processors, cause the one or more processors to: obtain an interpolated reference frame and motion information representing motion between an input frame and the interpolated reference frame; estimate, based on the motion information, the motion between the input frame and the interpolated reference frame; generate a warped frame at least in part by warping one or more pixels of the interpolated reference frame based on the estimated motion; and generate, based on the warped frame and a predicted residual, a reconstructed frame representing the input frame, the reconstructed frame including a bidirectionally-predicted frame.

Aspect 46: The non-transitory computer-readable medium of aspect 45, further comprising instructions which, when executed by the one or more processors, cause the one or more processors to perform operations according to any of aspects 41 to 44.

Aspect 47: An apparatus for processing video data, comprising: means for obtaining an interpolated reference frame and motion information representing motion between an input frame and the interpolated reference frame; means for estimating, based on the motion information, the motion between the input frame and the interpolated reference frame; means for generating a warped frame at least in part by warping one or more pixels of the interpolated reference frame based on the estimated motion; and means for generating, based on the warped frame and a predicted residual, a reconstructed frame representing the input frame, the reconstructed frame including a bidirectionally-predicted frame.

Aspect 48: The apparatus of aspect 47, further comprising means for performing operations according to any of aspects 41 to 44.

What is claimed is:

1. A system for processing video data, the system comprising:
  at least one processor, implemented in circuitry, and configured to:
    obtain a first reference frame and a second reference frame; and
    generate a third reference frame at least in part by performing interpolation between the first reference frame and the second reference frame;
    perform unidirectional inter-prediction on an input frame based on the third reference frame, wherein, to generate the third reference frame at least in part by performing interpolation between the first reference frame and the second reference frame, the at least one processor is further configured to:
    determine a first set of motion information representing pixel motion from the first reference frame to the third reference frame;

determine a second set of motion information representing pixel motion from the second reference frame to the third reference frame;

generate first warping information at least in part by performing a warping function on the first reference frame using the first set of motion information;

generate second warping information at least in part by performing the warping function on the second reference frame using the second set of motion information; and generate the third reference frame based on the first warping information and the second warping information.

2. The system of claim 1, wherein the at least one processor is further configured to:
estimate motion between the input frame and the third reference frame; and
generate a warped frame at least in part by warping one or more pixels of the third reference frame based on the estimated motion.

3. The system of claim 2, wherein the
the at least one processor is further configured to:
determine a residual at least in part by determining a difference between the input frame and the warped frame; and
generate a predicted residual using the residual.

4. The system of claim 3, further comprising a memory, the at least one processor being coupled to the memory and being further configured to:
generate, based on the warped frame and the predicted residual, a reconstructed frame representing the input frame, the reconstructed frame including a bidirectionally-predicted frame; and
wherein the at least one processor is further configured to cause the reconstructed frame to be stored in the memory.

5. The system of claim 4, wherein the at least one processor includes a neural processing unit (NPU).

6. The system of claim 3, wherein the at least one processor further includes a first neural network and a second neural network.

7. The system of claim 6, wherein the first neural network includes a first autoencoder and the second neural network includes a second autoencoder.

8. The system of claim 1, wherein the at least one processor is further configured to:
obtain a fourth reference frame;
estimate motion between an additional input frame and the fourth reference frame;
generate an additional warped frame at least in part by warping one or more pixels of the fourth reference frame based on the estimated motion; and
generate, based on the additional warped frame and an additional predicted residual, a reconstructed frame representing the additional input frame, the reconstructed frame representing the additional input frame including a unidirectionally-predicted frame.

9. The system of claim 1, wherein the at least one processor is further configured to determine the first set of motion information and the second set of motion information based on pixel motion between the first reference frame and the second reference frame.

10. The system of claim 1, wherein the first set of motion information includes a first optical flow map and the second set of motion information includes a second optical flow map.

11. The system of claim 1, wherein the warping function includes a bilinear interpolation function.

12. The system of claim 2, wherein the estimated motion between the input frame and the third reference frame includes optical flow data.

13. The system of claim 2, wherein the estimated motion between the input frame and the third reference frame includes dynamic convolution data.

14. The system of claim 2, wherein the estimated motion between the input frame and the third reference frame includes block-based motion data.

15. The system of claim 1, wherein the system is one of a mobile device, an extended reality device, or a television.

16. The system of claim 1, further comprising at least one of a display or a camera configured to capture one or more video frames.

17. A method for processing video data, the method comprising:
obtaining a first reference frame and a second reference frame;
generating a third reference frame at least in part by performing interpolation between the first reference frame and the second reference frame;
performing unidirectional inter-prediction on an input frame based on the third reference frame;
determining a first set of motion information representing pixel motion from the first reference frame to the third reference frame;
determining a second set of motion information representing pixel motion from the second reference frame to the third reference frame;
generating first warping information at least in part by performing a warping function on the first reference frame using the first set of motion information;
generating second warping information at least in part by performing the warping function on the second reference frame using the second set of motion information; and
generating the third reference frame based on the first warping information and the second warping information.

18. The method of claim 17, further comprising:
estimating motion between the input frame and the third reference frame; and
generating a warped frame at least in part by warping one or more pixels of the third reference frame based on the estimated motion.

19. The method of claim 18, further comprising:
determining a residual at least in part by determining a difference between the input frame and the warped frame; and
generating a predicted residual using the residual.

20. The method of claim 19, further comprising:
generating, based on the warped frame and the predicted residual, a reconstructed frame representing the input frame, the reconstructed frame including a bidirectionally-predicted frame; and
causing the reconstructed frame to be stored in a memory.

21. The method of claim 19, wherein the motion is estimated using a first autoencoder, and wherein the predicted residual is generated using a second autoencoder.

22. The method of claim 17, further comprising:
obtaining a fourth reference frame;
estimating motion between an additional input frame and the fourth reference frame;

generating an additional warped frame at least in part by warping one or more pixels of the fourth reference frame based on the estimated motion; and generating, based on the additional warped frame and an additional predicted residual, a reconstructed frame representing the additional input frame, the reconstructed frame representing the additional input frame including a unidirectionally-predicted frame.

23. The method of claim 17, wherein the first set of motion information and the second set of motion information are determined based on pixel motion between the first reference frame and the second reference frame.

24. The method of claim 17, wherein the first set of motion information includes a first optical flow map and the second set of motion information includes a second optical flow map.

25. The method of claim 17, wherein the warping function includes a bilinear interpolation function.

26. The method of claim 18, wherein the estimated motion between the input frame and the third reference frame includes optical flow data.

27. The method of claim 18, wherein the estimated motion between the input frame and the third reference frame includes dynamic convolution data.

28. The method of claim 18, wherein the estimated motion between the input frame and the third reference frame includes block-based motion data.

29. A non-transitory computer-readable medium having stored thereon instructions which, when executed by one or more processors, cause the one or more processors to:
obtain a first reference frame and a second reference frame;
generate a third reference frame at least in part by performing interpolation between the first reference frame and the second reference frame; and
perform unidirectional inter-prediction on an input frame based on the third reference frame, wherein the non-transitory computer-readable medium further comprises instructions which, when executed by the one or more processors, further cause the one or more processors to:
determine a first set of motion information representing pixel motion from the first reference frame to the third reference frame;
determine a second set of motion information representing pixel motion from the second reference frame to the third reference frame;
generate first warping information at least in part by performing a warping function on the first reference frame using the first set of motion information;
generate second warping information at least in part by performing the warping function on the second reference frame using the second set of motion information; and
generate the third reference frame based on the first warping information and the second warping information.

30. The non-transitory computer-readable medium of claim 29, further comprising instructions which, when executed by the one or more processors, cause the one or more processors to:
estimate motion between an input frame and the third reference frame; and
generate a warped frame at least in part by warping one or more pixels of the third reference frame based on the estimated motion.

31. The non-transitory computer-readable medium of claim 30, further comprising instructions which, when executed by the one or more processors, cause the one or more processors to:
determine a residual at least in part by determining a difference between the input frame and the warped frame; and
generate a predicted residual using the residual.

32. The non-transitory computer-readable medium of claim 31, further comprising instructions which, when executed by the one or more processors, cause the one or more processors to:
generate, based on the warped frame and the predicted residual, a reconstructed frame representing the input frame, the reconstructed frame including a bidirectionally-predicted frame; and
cause the reconstructed frame to be stored in a memory.

33. The non-transitory computer-readable medium of claim 31, wherein the motion is estimated using a first autoencoder, and wherein the predicted residual is generated using a second autoencoder.

34. The non-transitory computer-readable medium of claim 29, further comprising instructions which, when executed by the one or more processors, cause the one or more processors to:
obtain a fourth reference frame;
estimate motion between an additional input frame and the fourth reference frame;
generate an additional warped frame at least in part by warping one or more pixels of the fourth reference frame based on the estimated motion; and
generate, based on the additional warped frame and an additional predicted residual, a reconstructed frame representing the additional input frame, the reconstructed frame representing the additional input frame including a unidirectionally-predicted frame.

35. An apparatus for processing video data, the apparatus comprising:
means for obtaining a first reference frame and a second reference frame;
means for generating a third reference frame at least in part by performing interpolation between the first reference frame and the second reference frame;
means for performing unidirectional inter-prediction on an input frame based on the third reference frame;
means for determining a first set of motion information representing pixel motion from the first reference frame to the third reference frame;
means for determining a second set of motion information representing pixel motion from the second reference frame to the third reference frame;
means for generating first warping information at least in part by performing a warping function on the first reference frame using the first set of motion information;
means for generating second warping information at least in part by performing the warping function on the second reference frame using the second set of motion information; and
means for generating the third reference frame based on the first warping information and the second warping information.

36. The apparatus of claim 35, further comprising:
means for estimating motion between an input frame and the third reference frame; and means for generating a warped frame at least in part by warping one or more pixels of the third reference frame based on the estimated motion.

37. The apparatus of claim 36, further comprising:

means for determining a residual at least in part by determining a difference between the input frame and the warped frame; and means for generating a predicted residual using the residual.

38. The apparatus of claim 37, further comprising:

means for generating, based on the warped frame and the predicted residual, a reconstructed frame representing the input frame, the reconstructed frame including a bidirectionally-predicted frame; and means for causing the reconstructed frame to be stored in a memory.

39. The apparatus of claim 37, wherein the means for estimation motion is configured to estimate the motion using a first autoencoder, and wherein the predicted residual is generated using a second autoencoder.

40. The apparatus of claim 35, further comprising:

means for obtaining a fourth reference frame;

means for estimating motion between an additional input frame and the fourth reference frame;

means for generating an additional warped frame at least in part by warping one or more pixels of the fourth reference frame based on the estimated motion; and means for generating, based on the additional warped frame and an additional predicted residual, a reconstructed frame representing the additional input frame, the reconstructed frame representing the additional input frame including a unidirectionally-predicted frame.

* * * * *